US012699936B2

(12) United States Patent
Rademaker

(10) Patent No.: US 12,699,936 B2
(45) Date of Patent: Aug. 4, 2026

(54) SYSTEMS AND METHODS FOR SERVICING CURB-SIDE DELIVERIES

(71) Applicant: Radius Networks, Inc., Washington, DC (US)

(72) Inventor: William B. Rademaker, Seattle, WA (US)

(73) Assignee: Radius Networks, Inc., Washington, DC (US)

( * ) Notice: Subject to any disclaimer, the term of this patent is extended or adjusted under 35 U.S.C. 154(b) by 0 days.

(21) Appl. No.: 18/391,622

(22) Filed: Dec. 20, 2023

(65) Prior Publication Data

US 2025/0209412 A1 Jun. 26, 2025

Related U.S. Application Data

(63) Continuation of application No. 15/051,516, filed on Feb. 23, 2016, now abandoned.

(60) Provisional application No. 62/119,707, filed on Feb. 23, 2015.

(51) Int. Cl.
| | |
|---|---|
| *G06Q 10/0631* | (2023.01) |
| *G06Q 10/08* | (2024.01) |
| *G06Q 10/083* | (2024.01) |
| *G06Q 10/0833* | (2023.01) |
| *G06Q 30/0601* | (2023.01) |

(52) U.S. Cl.
CPC ..... *G06Q 10/063114* (2013.01); *G06Q 10/08* (2013.01); *G06Q 10/083* (2013.01); *G06Q 10/0833* (2013.01); *G06Q 10/08355* (2013.01); *G06Q 30/0635* (2013.01)

(58) Field of Classification Search
CPC ..................... G06Q 10/0833; G06Q 10/08355
See application file for complete search history.

(56) References Cited

U.S. PATENT DOCUMENTS

| | | | |
|---|---|---|---|
| 9,582,797 | B1 | 2/2017 | Holmes et al. |
| 9,772,193 | B1 | 9/2017 | Mendelson |
| 9,952,049 | B2 | 4/2018 | Zhang et al. |
| 10,921,147 | B1 | 2/2021 | Hapgood et al. |

(Continued)

FOREIGN PATENT DOCUMENTS

| | | |
|---|---|---|
| WO | WO2006126996 A1 | 11/2006 |
| WO | WO2012135143 A2 | 10/2012 |
| WO | WO2022272242 A1 | 12/2022 |

OTHER PUBLICATIONS

Christian Hillbrand, Shipment Localization Kit: An Automated Approach for Tracking and Tracing General Cargo, 2007, p. 1-2 (Year: 2007).*

(Continued)

*Primary Examiner* — Ibrahim N El-Bathy
(74) *Attorney, Agent, or Firm* — Lee & Hayes, P.C.

(57) ABSTRACT

Techniques for providing information using an information providing system connected to a plurality of computing devices via a network. The information providing system may receive information indicating that an object is to be provided at a first location. The information providing system may cause presentation of a first alert on a computing device associated with a user. The information providing system may further receive an input indicating that the user intends to provide the object and receive an acknowledgement response to the information.

20 Claims, 9 Drawing Sheets

(56)          References Cited

U.S. PATENT DOCUMENTS

| | | | |
|---|---|---|---|
| 11,521,161 | B2 | 12/2022 | Zhang et al. |
| 2008/0280624 | A1 | 11/2008 | Wrappe |
| 2010/0324959 | A1* | 12/2010 | Templeton ............. G06Q 10/08 |
| | | | 705/14.1 |
| 2013/0069823 | A1 | 3/2013 | van Diggelen |
| 2013/0132231 | A1* | 5/2013 | Teudt ..................... G06Q 30/06 |
| | | | 705/26.8 |
| 2013/0346237 | A1* | 12/2013 | Rademaker ........ G06Q 10/0836 |
| | | | 705/26.8 |
| 2014/0074743 | A1 | 3/2014 | Rademaker |
| 2014/0180959 | A1 | 6/2014 | Gillen |
| 2014/0222570 | A1 | 8/2014 | Devolites et al. |
| 2014/0279294 | A1 | 9/2014 | Field-Darragh et al. |
| 2015/0081362 | A1* | 3/2015 | Chadwick ............. G06Q 50/40 |
| | | | 705/7.14 |
| 2015/0120514 | A1 | 4/2015 | Deshpande et al. |
| 2015/0227890 | A1 | 8/2015 | Bednarek et al. |
| 2015/0302495 | A1* | 10/2015 | Stuckman ............. G01S 5/0284 |
| | | | 705/26.35 |
| 2015/0347937 | A1* | 12/2015 | Arlitt ..................... G06N 5/046 |
| | | | 705/7.28 |
| 2015/0359127 | A1* | 12/2015 | Daoura .................. G08B 21/24 |
| | | | 361/752 |
| 2016/0063435 | A1* | 3/2016 | Shah .................. G06Q 30/0633 |
| | | | 705/44 |
| 2016/0068264 | A1* | 3/2016 | Ganesh ............... G05D 1/0676 |
| | | | 701/4 |
| 2016/0078397 | A1* | 3/2016 | Barton ................. G06Q 20/322 |
| | | | 705/67 |
| 2016/0092943 | A1 | 3/2016 | Vigier et al. |
| 2019/0297243 | A1* | 9/2019 | Oshima .................. H04N 23/73 |
| 2019/0385121 | A1 | 12/2019 | Waliany et al. |
| 2020/0160268 | A1* | 5/2020 | Han ....................... G06N 3/084 |
| 2020/0167722 | A1 | 5/2020 | Goldberg |
| 2020/0242553 | A1 | 7/2020 | Zhang et al. |
| 2020/0250737 | A1 | 8/2020 | Wallace et al. |
| 2020/0327492 | A1* | 10/2020 | Weiby ............. G06Q 10/08345 |
| 2021/0065107 | A1 | 3/2021 | Jajula |
| 2021/0089995 | A1* | 3/2021 | Iacono ................. G06Q 10/083 |
| 2021/0216959 | A1 | 7/2021 | Hapgood et al. |
| 2021/0364651 | A1 | 11/2021 | Helms et al. |
| 2022/0051183 | A1 | 2/2022 | Franzo |
| 2024/0012159 | A1 | 1/2024 | Helms |
| 2025/0139570 | A1 | 5/2025 | Judkins |
| 2025/0285166 | A1 | 9/2025 | Lee |

OTHER PUBLICATIONS

Steinfield, et al., "Integrating Brick and Mortar Locations with E-Commerce: Understanding Synergy Opportunities", 2002 Proceedings of the 35th Hawaii International Conference on System Sciences, Jan. 2002, 10 pgs.

Office Action for U.S. Appl. No. 15/051,516, Mailed on Feb. 24, 2021 Rademaker, William B. "Systems and Methods for Servicing Curb-Side Deliveries" 25 pages.

PCT Search Report and Written Opinion mailed Aug. 24, 2021 for PCT Application No. PCT/US21/33175, 12 pages.

Office Action for U.S. Appl. No. 15/051,516, mailed on Feb. 9, 2024, Rademaker, "Systems and Methods for Servicing Curb-Side Deliveries", 33 Pages.

Office Action for U.S. Appl. No. 15/051,516, mailed on Apr. 12, 2022, Rademaker, "Systems and Methods for Servicing Curb-Side Deliveries", 28 Pages.

Office Action for U.S. Appl. No. 15/051,516, Mailed on Jun. 8, 2021 Rademaker, William B. "Systems and Methods for Servicing Curb-Side Deliveries" 28 pages.

Office Action for U.S. Appl. No. 15/051,516, mailed on Jul. 20, 2023, Rademaker, "Systems and Methods for Servicing Curb-Side Deliveries", 30 Pages.

Office Action for U.S. Appl. No. 15/051,516, mailed on Aug. 10, 2022, Rademaker, "Systems and Methods for Servicing Curb-Side Deliveries", 28 Pages.

Office Action for U.S. Appl. No. 15/051,516, Mailed on Oct. 22, 2019 Rademaker, William B. "Systems and Methods for Servicing Curb-Side Deliveries" 129 pages.

Office Action for U.S. Appl. No. 15/051,516, mailed on Dec. 21, 2022, Rademaker, "Systems and Methods for Servicing Curb-Side Deliveries", 27 Pages.

Office Action for U.S. Appl. No. 15/051,516, Mailed on Feb. 20, 2019 Rademaker, William B. "Systems and Methods for Servicing Curb-Side Deliveries" 27 pages.

Office Action for U.S. Appl. No. 16/879,537, mailed on Feb. 13, 2023, Inventor #1 David Helms, "GPS Based Location Determination Using Accurately Mapped Polygonal Areas", 16 pages.

Office Action for U.S. Appl. No. 18/497,486, mailed on Jun. 13, 2024, Judkins, "Systems and Methods for Machine-Learning Optimization for Estimated Time of Arrival Analysis", 27 pages.

Office Action for U.S. Appl. No. 18/350,156, dated Apr. 21, 2025, 17 Pages.

Office Action for U.S. Appl. No. 18/497,486, dated Apr. 28, 2025, 22 Pages.

Office Action for U.S. Appl. No. 18/497,486, mailed on Jan. 16, 2025, Judkins, "Systems and Methods for Machine-Learning Optimization for Estimated Time of Arrival Analysis", 34 Pages.

Search Report and Written Opinion for International Application No. PCT/US2024/053015, Dated Feb. 7, 2025, 14 pages.

Bhattacharya, Wrishin, "Expected Time of Arrival Predictor," Apr. 9, 2023, Linked In, pp. 1-6. https://www.linkedin.com/pulse/ expected-ti me-arrival-predictor-wrishin-bhattacharya#:-:text= Machi ne%20 Learning %20 Mode Is %20for %20 Et A, %2C%2otraffic%2C% 20and%20weather%20conditions. (Year: 2023) 6 pages.

Hu. Xinyu et al., "DeeprETA: An ETA Post-processing System at Scale," Jun. 5, 2022, Uber Technologies Inc., pp. 1-9. https://arxiv. org/pdf/2206.02127. (Year: 2022) 23 pages.

* cited by examiner

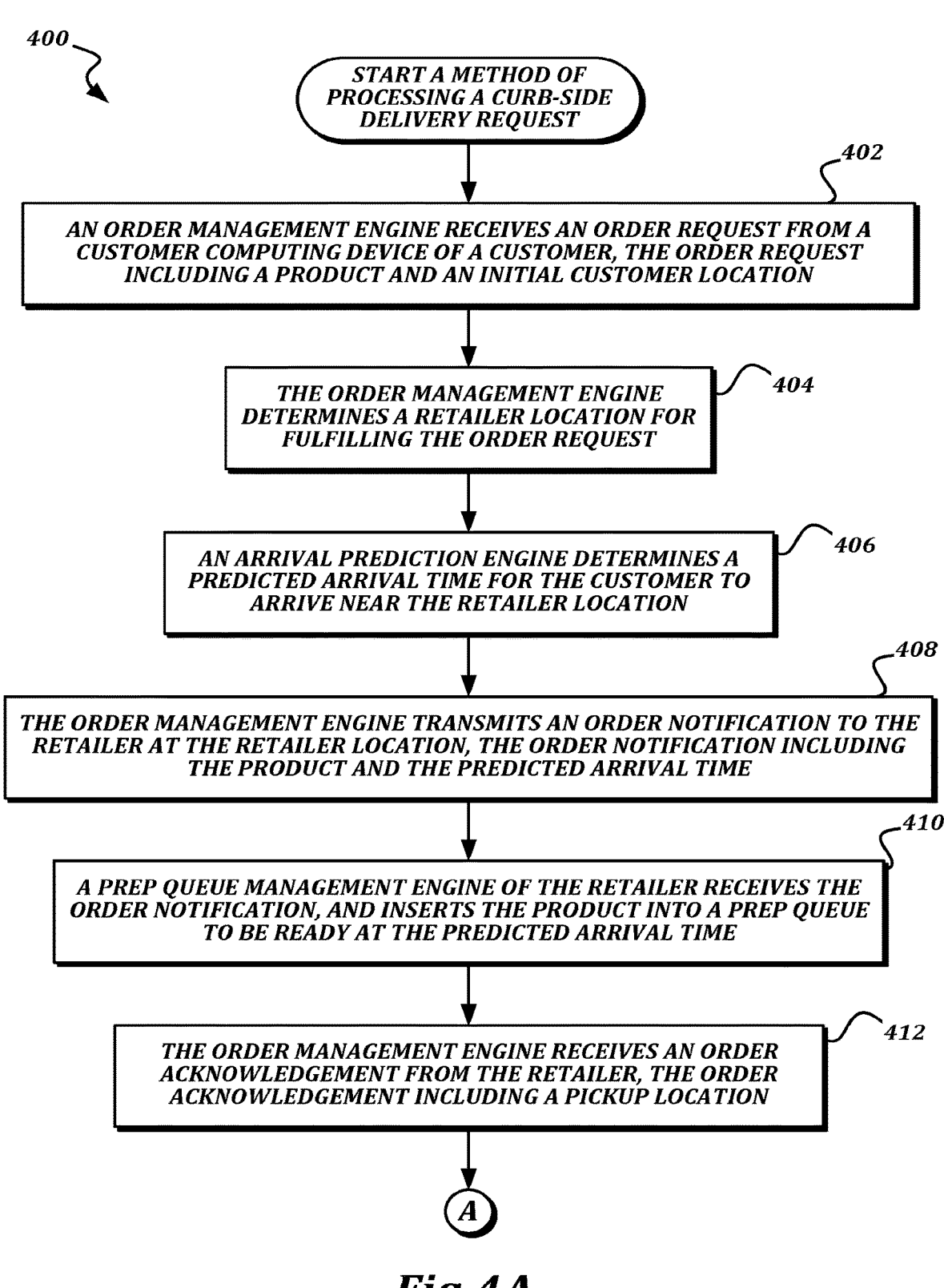

*400*

START A METHOD OF PROCESSING A CURB-SIDE DELIVERY REQUEST

*402*

AN ORDER MANAGEMENT ENGINE RECEIVES AN ORDER REQUEST FROM A CUSTOMER COMPUTING DEVICE OF A CUSTOMER, THE ORDER REQUEST INCLUDING A PRODUCT AND AN INITIAL CUSTOMER LOCATION

*404*

THE ORDER MANAGEMENT ENGINE DETERMINES A RETAILER LOCATION FOR FULFILLING THE ORDER REQUEST

*406*

AN ARRIVAL PREDICTION ENGINE DETERMINES A PREDICTED ARRIVAL TIME FOR THE CUSTOMER TO ARRIVE NEAR THE RETAILER LOCATION

*408*

THE ORDER MANAGEMENT ENGINE TRANSMITS AN ORDER NOTIFICATION TO THE RETAILER AT THE RETAILER LOCATION, THE ORDER NOTIFICATION INCLUDING THE PRODUCT AND THE PREDICTED ARRIVAL TIME

*410*

A PREP QUEUE MANAGEMENT ENGINE OF THE RETAILER RECEIVES THE ORDER NOTIFICATION, AND INSERTS THE PRODUCT INTO A PREP QUEUE TO BE READY AT THE PREDICTED ARRIVAL TIME

*412*

THE ORDER MANAGEMENT ENGINE RECEIVES AN ORDER ACKNOWLEDGEMENT FROM THE RETAILER, THE ORDER ACKNOWLEDGEMENT INCLUDING A PICKUP LOCATION

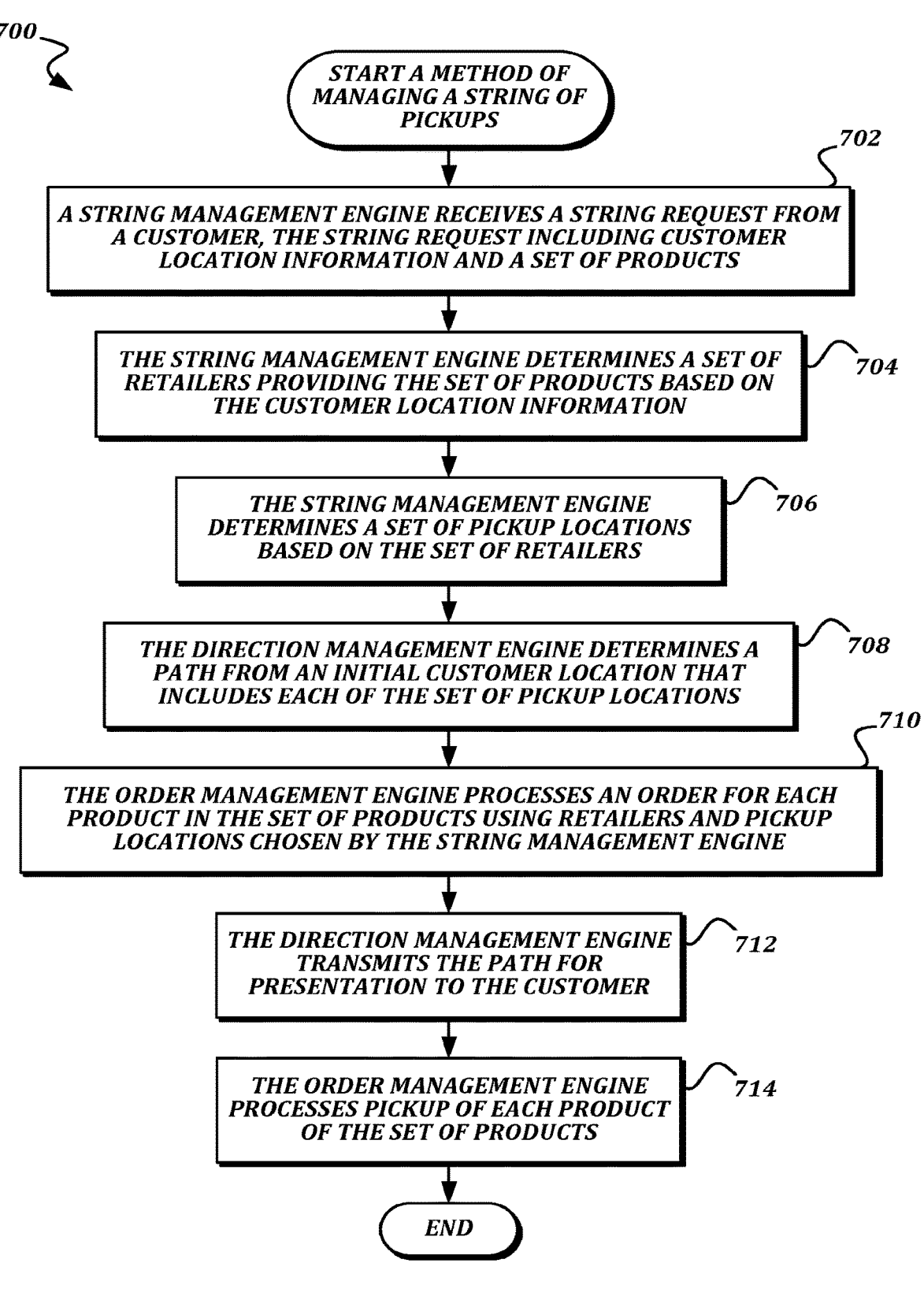

*700*

*START A METHOD OF MANAGING A STRING OF PICKUPS*

*702*

*A STRING MANAGEMENT ENGINE RECEIVES A STRING REQUEST FROM A CUSTOMER, THE STRING REQUEST INCLUDING CUSTOMER LOCATION INFORMATION AND A SET OF PRODUCTS*

*704*

*THE STRING MANAGEMENT ENGINE DETERMINES A SET OF RETAILERS PROVIDING THE SET OF PRODUCTS BASED ON THE CUSTOMER LOCATION INFORMATION*

*706*

*THE STRING MANAGEMENT ENGINE DETERMINES A SET OF PICKUP LOCATIONS BASED ON THE SET OF RETAILERS*

*708*

*THE DIRECTION MANAGEMENT ENGINE DETERMINES A PATH FROM AN INITIAL CUSTOMER LOCATION THAT INCLUDES EACH OF THE SET OF PICKUP LOCATIONS*

*710*

*THE ORDER MANAGEMENT ENGINE PROCESSES AN ORDER FOR EACH PRODUCT IN THE SET OF PRODUCTS USING RETAILERS AND PICKUP LOCATIONS CHOSEN BY THE STRING MANAGEMENT ENGINE*

*712*

*THE DIRECTION MANAGEMENT ENGINE TRANSMITS THE PATH FOR PRESENTATION TO THE CUSTOMER*

*714*

*THE ORDER MANAGEMENT ENGINE PROCESSES PICKUP OF EACH PRODUCT OF THE SET OF PRODUCTS*

*END*

PROCESSOR

STORAGE MEDIUM

SYSTEM
MEMORY

COMMUNICATION BUS

806

810

NETWORK
INTERFACE

SYSTEMS AND METHODS FOR SERVICING CURB-SIDE DELIVERIES

RELATED APPLICATIONS

This Application is a continuation of and claims priority to U.S. patent application Ser. No. 15/051,516, filed Feb. 23, 2016, which claims priority to U.S. Provisional Patent Application No. 62/119,707, filed Feb. 23, 2015, which are incorporated herein by reference.

BACKGROUND

Ease of the purchase and order fulfillment experience, for any product or service, is a key contributor to consumer decisions to purchase from one particular business over another. The rise of online shopping is a good example where ease of use is leading to an increase of use, as consumers decide to forego traffic, parking hassles, and other problems with brick and mortar retailers by ordering from the comfort of their home. Competing with online merchants has proven a significant challenge for brick-and-mortar retailers, even those with a web presence. It takes less time and expense to order from home than to travel to a store, look for parking, pay for parking, walk to the store, peruse as they would on-line, wait in payment line, then do it all again in reverse order to return home. The parking hassles in particular pose a great challenge to brick and mortar retailers, especially in urban areas where parking stalls may be increasingly sparse and expensive.

However, visiting locations associated with traditional brick and mortar retailers, such as storefronts, warehouses, service centers, and/or the like, may remain preferable for consumers with time-relevant needs, as picking up an item from a nearby retail location may still be faster than waiting for a delivery to arrive. Likewise, for perishable goods such as food take-out, or for personal goods such as dry-cleaning, visiting a brick-and-mortar retailer may remain the most practical option. For prepared food or simple errands, take-out/pickup may be an increasingly popular option, especially when it can be done as part of an efficient travel stream in a string of errands. Brick-and-mortar retailers should be playing up this inherent advantage, and should try to minimize the greatest difficulties of visiting retail locations: parking and waiting for ordered products to be ready. What is needed is a way to reduce these difficulties of purchasing products from brick-and-mortar retailers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a wearable employee device for use with a pickup management system by an employee of a retailer is provided. The device comprises at least one processor, a wireless interface, an input device, and a computer-readable medium. The computer-readable medium has computer-executable instructions stored thereon that, in response to execution by the at least one processor, cause the wearable employee device to perform actions comprising: receiving, via the wireless interface from a pickup management system, a notice about an order to be delivered from the retailer to a customer at a pickup location; presenting a first alert to attract the attention of the employee; receiving, via the input device, an input indicating that the employee intends to deliver the order; and transmitting, via the wireless interface, an acknowledgement response to the notice.

In some embodiments, a computer-implemented method of coordinating a product delivery from a retailer is provided. A pickup management system transmits a first notification indicating an order for delivery to a customer at a pickup location. The pickup management system receives an acknowledgement response to the notification from a wearable employee device. The pickup management system transmits information relating to the order to the wearable employee device for presentation by the wearable employee device.

In some embodiments, a system for coordinating curb-side deliveries is provided. The system comprises one or more wearable employee devices and a pickup management system. The pickup management system includes one or more computing devices configured to: transmit a first notification to a first subset of the one or more wearable employee devices, the first notification indicating an order for delivery to a customer at a pickup location; receive, from an accepting wearable employee device of the one or more wearable employee devices, an acknowledgement response to assign the order for delivery to the accepting wearable employee device; and transmit order information to the accepting wearable employee device.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIGS. 4A-4B are a flowchart that illustrates one embodiment of a method of processing a curb-side delivery request according to various aspects of the present disclosure;

FIG. 7 is a flowchart that illustrates an exemplary embodiment of a method of managing a string of pickups according to various aspects of the present disclosure.

DETAILED DESCRIPTION

In some embodiments of the present disclosure, systems and methods are provided that accept an order from a customer for a product from a retailer, track the location of the customer to monitor the customer's progress to the retailer, and coordinate preparation/fulfillment of the product by the retailer to coincide with the customer's arrival at the retailer. In some embodiments, the system may process payment from the customer, including processing payment for multiple items from multiple retailers, further reducing the time it takes for the customer to obtain the product from the retailer. In some embodiments, the system may also coordinate the delivery by the retailer of the product directly to the customer in the vicinity of the retailer's location. For example, the retailer may deliver the product directly to a vehicle of the customer, such that the customer may simply pull into a pre-designated parking space near the retailer to receive the product. In some embodiments, the customer may interact with the system using a mobile device, which is also used by the system to track the location of the customer.

The generational leap that embodiments of the present disclosure provides in the customer experience is likely to provide a variety of benefits, including an increase in business for retailers who may otherwise lose business from customers who would choose to avoid purchasing products from the retailer due to the time and effort needed to obtain the product from the retailer in a traditional manner. Other benefits may include, but are not limited to, a reduction in traffic caused by customers searching for parking in proximity to a retailer, greater accessibility for customers with limited mobility, increased order volume and new marketing channels for retailers in locations difficult to access by car, less time spent by retailers in servicing individual customers, and/or the like. Embodiments of the present disclosure may also provide improvements over systems that provide scheduled pickups at a predetermined or specific time, as various aspects allow the retailer to compensate for traffic, unpredictable travel paths, changing travel assumptions, and/or any other reason why the customer would not arrive to pick up the ordered product at the predetermined or specific time.

Figure 1:
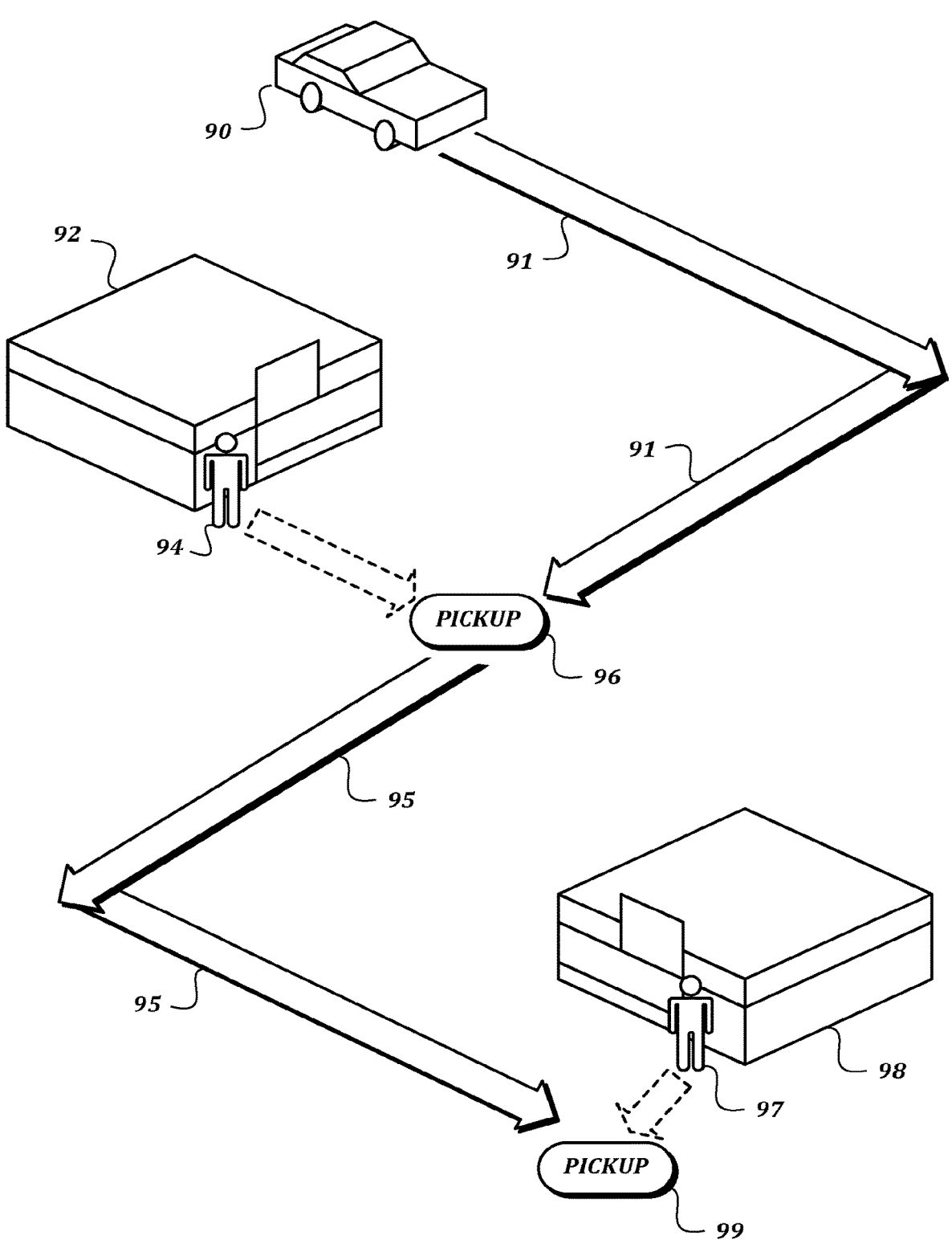
FIG. 1 is a schematic drawing that illustrates an overall concept of various embodiments of the present disclosure.

FIG. 1 is a schematic drawing that illustrates the overall concept of various embodiments of the present disclosure. A customer uses a pickup management system to order a first product from a first retailer 92 and a second product from a second retailer 98. In some embodiments, the customer may communicate with the pickup management system using a mobile computing device, as will be discussed further below. The customer then uses a vehicle 90 to travel a path 91 to a first pickup location 96 near the first retailer 92. In some embodiments, the customer may travel the path 91 on foot, using a vehicle other than an automobile, or via any other suitable method. The pickup management system tracks the location of the customer and predicts a time at which the customer will arrive at the first pickup location 96. The pickup management system instructs the first retailer 92 to prepare the first product, such that the first product is ready at the predicted arrival time. The pickup management system may also guide the customer to the first pickup location 96 and may specify the first pickup location 96 with a high degree of precision, such as a particular parking spot, a particular side of the street, an approach path, and/or the like. An employee 94 of the first retailer 92 takes the first product to the first pickup location 96 at the predicted arrival time, and transfers it to the vehicle 90 of the customer.

The term "employee" is used throughout the present disclosure for ease of discussion to refer to a person associated with a retailer that interacts with an embodiment of the present disclosure, prepares products for delivery to a customer at a pickup location, and/or provides the product to the customer at the pickup location. Typically, this person may be an employee of the retailer, but other people, such as owners of the retailer, temporary staff of the retailer, subcontractors associated with the retailer, volunteers, and/or any other type of person may perform the tasks of the "employee" discussed herein. In some embodiments, some tasks described as performed by an employee may instead be performed by one or more automated systems or devices. In some embodiments, some of the tasks of the employee discussed herein may be performed by third parties. For example, a set of pickup location couriers may be associated with the system 200, and instead of having an actual employee of the retailer take the product to the pickup location, one of the pickup location couriers may be dispatched to the retailer to take the product to the pickup location. In such an embodiment, the actual retailer may have very little interaction with the system 200, to the point where the courier may even enter the retailer and place the order as a regular customer might do instead of having the order transmitted directly by the pickup management system 204 to the retailer. In some embodiments, the customer may be able to designate a third-party to pick up an item for them, and the functionality related to picking up the order may utilize a computing device associated with the third party and designated by the customer.

The term "curb-side delivery" is also used within the present disclosure for ease of discussion to refer to pickups facilitated by embodiments of the present disclosure. This term is used because in some embodiments a customer may park their vehicle at a pickup location on a street within close proximity to the retailer, a location referred to as "curb-side." While this term is descriptive of some embodiments of the present disclosure, it is not meant to be limiting, and will be understood by one of ordinary skill in the art to include arrival at any type of pickup location via any method of travel. In some embodiments, the pickup location may be mobile (such as a truck, a courier, and/or the like), and the changing location of the pickup location may be tracked via GPS and/or the like in order to provide updated directions to the pickup location for the customer.

While embodiments that include orders originating with the customer for the purchase of a product are primarily described herein, in some embodiments, orders may be created in other ways and may relate to other types of items. In some embodiments, a retailer may create an order for a product, which is then pushed to the customer for approval. For example, an employee of the retailer may be speaking with the customer over the phone, and the customer may agree to purchase a product and pick it up using the system 200. The employee may create the order for the product within the system 200, which may then push a notification related to the order to a customer computing device 202, said notification potentially including a payment confirmation interface. In some embodiments, the system 200 may be used in situations that do not involve the purchase of a product. For example, a customer and a service-providing retailer such as a drycleaner and/or the like may interact using the system 200 to process drop off and pickup of products already owned by the customer for processing by the service-providing retailer. The customer may create an order for services, and may arrive at the pickup location to drop off the product to have the services performed. Conversely, the service-providing retailer may create an order within the system 200 that is pushed to the customer when the services have been completed and the product is ready for pickup. In some embodiments, the system 200 may be used to schedule a return and drop off of an item that was previously purchased by the customer.

In some embodiments, the pickup management system may be used to manage the pickup of a single product. In other embodiments (such as the embodiment illustrated in FIG. 1), the pickup management system may be used to manage the pickup of several products in a row. In such an embodiment, after picking up the first product, the customer then continues on a path 95 to the second retailer 98, which is similarly instructed to prepare the second product to be ready at a predicted arrival time at a second pickup location 99. An employee 97 of the second retailer 98 takes the second product to the second pickup location 99 at the predicted arrival time at the second pickup location 99, and transfers the second product to the vehicle 90 of the customer.

Figure 2:
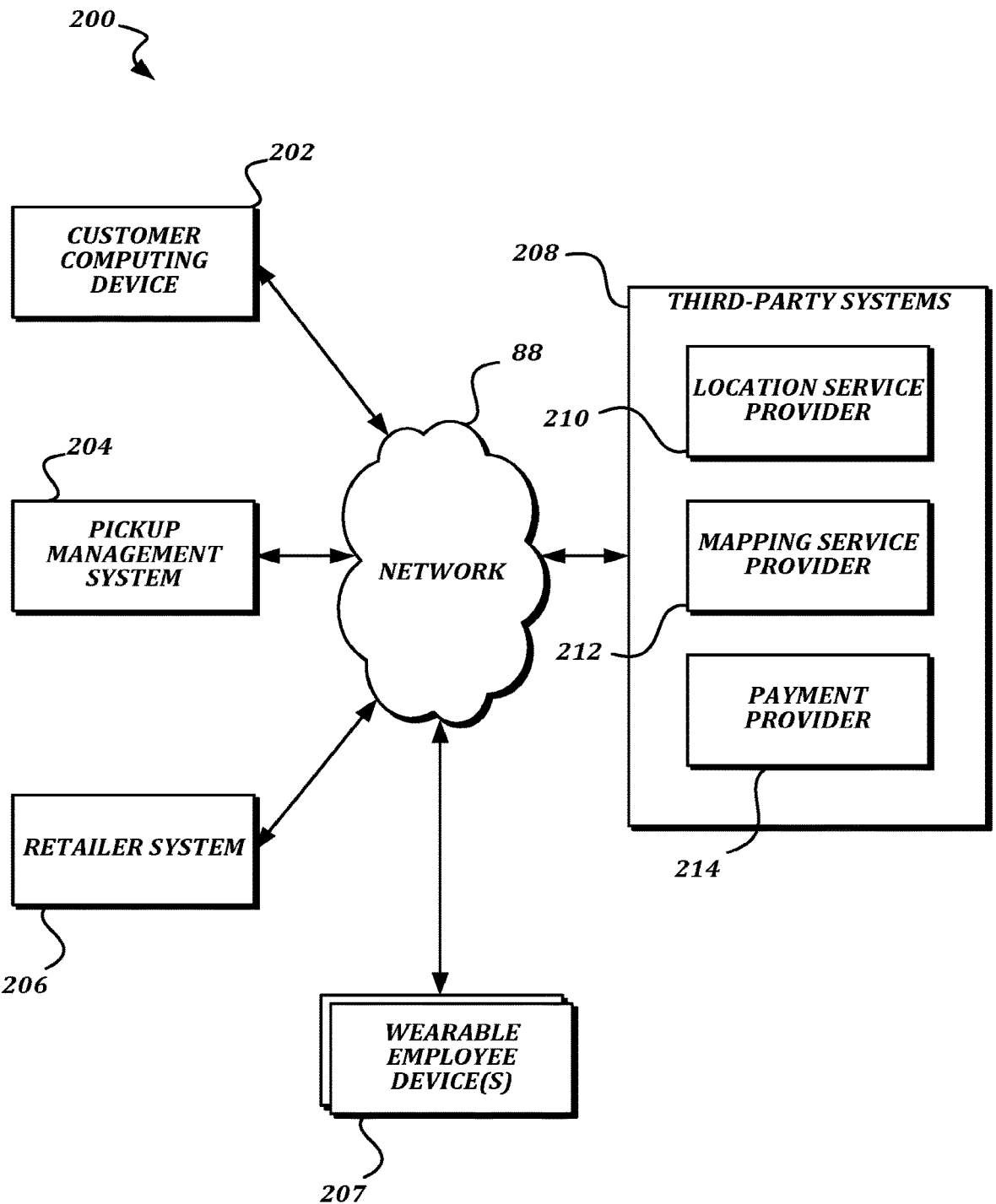
FIG. 2 is a block diagram that illustrates, at a high level, various aspects of an exemplary embodiment of the present disclosure.

FIG. 2 is a block diagram that illustrates, at a high level, various aspects of an exemplary embodiment of the present disclosure. The illustrated embodiment of the system 200 includes a customer computing device 202, a pickup management system 204, a retailer system 206, and one or more wearable employee devices 207. Each of these elements may communicate with each other via any suitable network 88. In some embodiments, the network 88 may include portions of the Internet; cellular telephone data networks such as 3G networks, 4G networks, or LTE networks; wireless networks such as WiFi or WiMax networks; and/or the like.

The customer computing device 202 may be used by the customer to interact with the pickup management system 204, such as for performing actions relating to ordering products, providing payment for products, tracking a location of the customer, guiding the customer to a pickup location, adapting to the actual travel path of the customer, and/or the like. The customer computing device 202 may be configured to allow anonymous communication with a selected retailer, mediated by the pickup management system 204, either by voice, SMS, email, push alerts, and/or any other suitable form of communication.

In some embodiments, the customer computing device 202 may be a mobile device such as a smart phone or tablet computer. In some embodiments, the customer computing device 202 may be any other type of suitable computing device configured to perform the actions described in relation to the customer computing device 202, such as an embedded computing device associated with a vehicle, a desktop computer, a laptop computer, and/or the like. Though the customer computing device 202 is primarily illustrated and described herein as a single computing device, in some embodiments, the functionality of the customer computing device 202 may be split between multiple computing devices. For example, in some embodiments, multiple computing devices may be used by a customer during the course of a single order. In such embodiments, the customer may, for example, place an order with a desktop computer that executes portions of the customer interface engine 302, and may then use a mobile device such as a smart phone and/or the like to execute other portions of the customer interface engine 302 and the location engine 304 to further coordinate pickup of the order while en route to the pickup location.

The pickup management system 204 may include one or more computing devices such as desktop computers, laptop computers, server computers, and/or the like. In some embodiments, the pickup management system 204 receives orders from customer computing devices 202, and instructs retailers to prepare the orders in time for the predicted arrival of the customers. In some embodiments, the pickup management system 204 may direct the customer to the vicinity of the retailer, and the customer may themselves choose a most convenient place in the vicinity of the retailer to stop. In some embodiments, the pickup management system 204 may direct the customer and/or an employee of the retailer to a precise pickup location through interfaces presented by the customer computing device 202 and/or the retailer system 206, such as a drive-through pickup lane, a particular parking spot, a particular place in a loading zone, and/or the like. The pickup management system 204 may also be configured to help process payment information received from the customer, and to mediate communication between the customer computing device 202 and a retailer.

The retailer system 206 may include one or more computing devices such as desktop computers, laptop computers, server computers, and/or the like. In some embodiments, the retailer system 206 receives orders from the pickup management system 204 and presents them in a preparation queue on a computing device located at the retailer, so that each order may be prepared by the retailer in time to be delivered to the appropriate customer when the customer arrives at a pickup location. The retailer system 206 may also provide an interface that directs employees of the retailer to the pickup location, and/or allows employees of the retailer to communicate with the customer while the customer is en route to the pickup location. In some embodiments, the retailer system 206 may include one or more wearable employee devices 207, such as smart phones, tablet computers, PDAs, and/or the like, which may execute portions of the retailer interface engine 322 to help an employee manage communications with customers, consummate pickup meetings, and/or any other function of the retailer interface engine 322. In some embodiments, all or some, or even one, employees of a retailer wear a bracelet computing device capable of communicating wirelessly with the pickup management system 204 (herein described as bracelet, but could be implemented as any type of wearable on any part of the clothing or body, or may be devices that are in the vicinity of certain store employees, or visible to store employees from afar and are not wearables at all). The bracelet may have certain functions to grab a user's attention, such as vibration, audio, or visual cues, which shall be described here as vibration. In some embodiments, an employee may carry multiple wearable employee devices 207 that work together. For example, an employee may carry an iPhone that uses an app to communicate with the pickup management system 204, and also an Apple Watch that communicates with the iPhone in order to provide vibration and user interface functionality to the employee. Though iPhone and Apple Watch are mentioned above, one of ordinary skill in the art will recognize that smartphones made by other companies including but not limited to Microsoft, Samsung, and/or the like; and wearable devices made by other manufacturers, including but not limited to Microsoft Band, Pebble Smartwatch, Samsung Gear, and/or the like, may be used instead.

In some embodiments, the retailer system 206 may operate separately from any other retailer data management systems, and so no integration between the retailer system 206 and existing point-of-sale devices and/or the like need be performed. For example, components of the retailer system 206 may execute on or be accessible by the mobile employee computing devices only.

As illustrated, the system 200 may also include various third-party systems 208. The customer computing device 202, the pickup management system 204, and the retailer system 206 may be configured to communicate with the third party systems 208 to provide various functionalities. For example, a location service provider 210 such as a Global Positioning System (GPS) service, a cellular positioning system, and/or the like may provide location information identifying a location of the customer. As another example, a mapping service provider 212 such as Google Maps, Bing Maps, Navteq, and/or the like, may provide map images, route-finding functionality, traffic congestion information, and/or the like to other portions of the system 200. As yet another example, a payment provider 214 such as PayPal, a traditional credit card provider, a traditional bank, and/or the like, may be used to provide funds from an account of the customer as a payment for the customer's order from the system 200. The illustrated third-party systems 208 are exemplary only, and in some embodiments, more or fewer third-party systems 208 may also be used. In some embodiments, the system 200 may make use of a third-party product or inventory search engine such as Google Product search and/or the like. In some embodiments, at least some of the functionality provided by the third-party systems 208 may not be provided by third parties, but instead may be provided by the same provider as the pickup management system 204.

Figure 3:
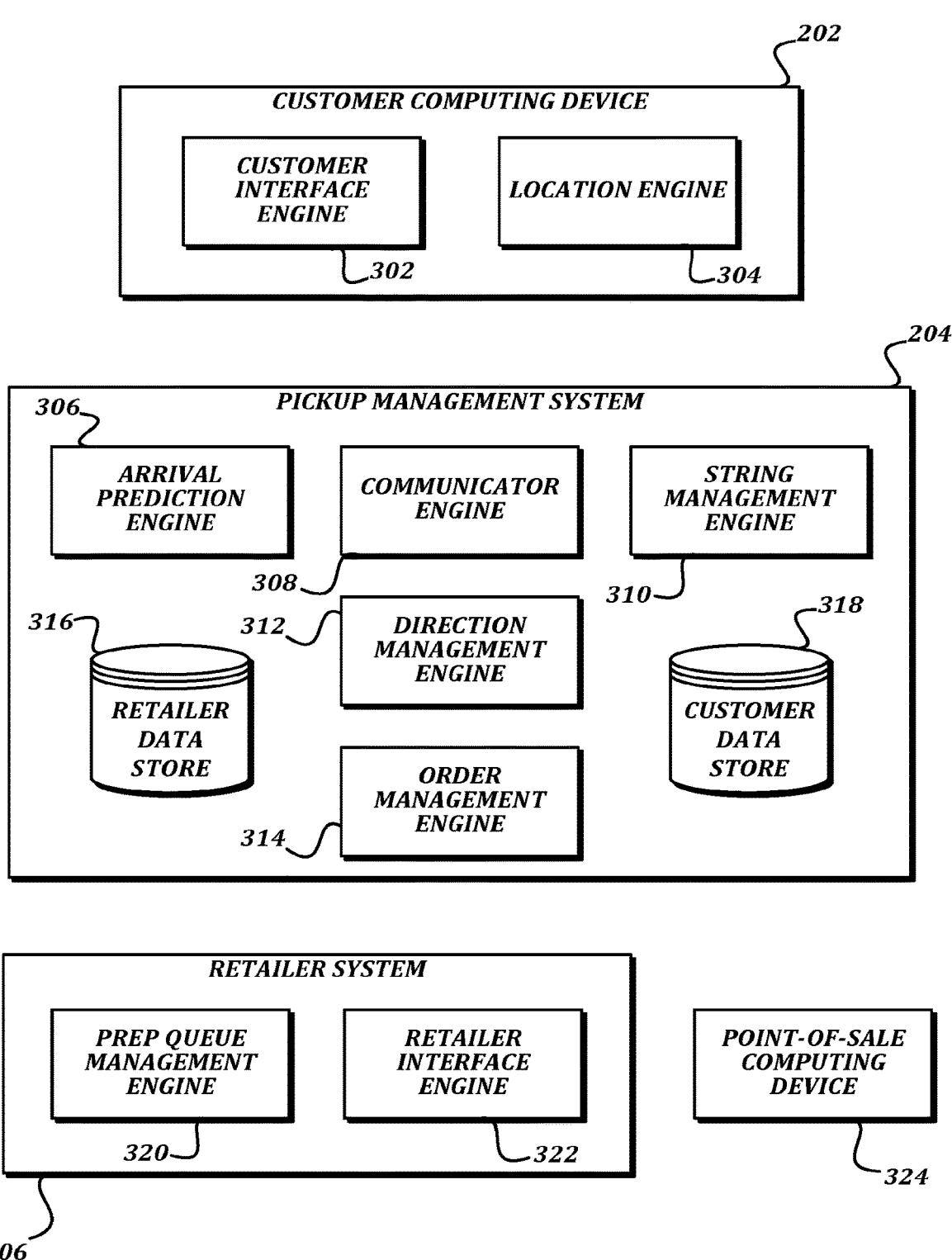
FIG. 3 is a block diagram that illustrates further details of an exemplary embodiment of a customer computing device, a pickup management system, and a retailer system, according to various aspects of the present disclosure.

FIG. 3 is a block diagram that illustrates further details of an exemplary embodiment of a customer computing device 202, a pickup management system 204, and a retailer system 206, according to various aspects of the present disclosure.

As illustrated, the customer computing device 202 includes a customer interface engine 302 and a location engine 304. In general, the word "engine" (used interchangeably with the word "application"), as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C#, and/or the like. An engine may be compiled into executable programs or written in interpreted programming languages. Software engines or applications may be callable from other engines or from themselves. Generally, the engines or applications described herein refer to logical modules that can be merged with other engines or applications, or can be divided into sub-engines. The engines or applications can be stored in any type of computer-readable medium or computer storage device and be stored on and executed by one or more general purpose computers, thus creating a special purpose computer configured to provide the engine or application.

In the illustrated embodiment, the customer interface engine 302 may be a program executing on the customer computing device 202, an HTML5 application or other web application presented by the customer computing device 202, or any other suitable type of user interface. In some embodiments, the customer interface engine 302 may include a web browser plug-in, add-on, or other technology that is configured to monitor web browsing, and may cause an interface element to be displayed that leads the customer to create an order in the pickup management system 204 upon detecting that the customer is browsing for a product available via a retailer associated with the pickup management system 204.

The customer interface engine 302 provides an interface to various functionalities provided by the pickup management system 204. For example, the customer interface engine 302 may be configured to help a customer order a product by presenting a list of available products, accepting an order for a product, requesting a return, canceling an order, accepting payment for the order, and/or the like. As another example, the customer interface engine 302 may be configured to help a customer build a string of pickups based on a planned path of travel or a set of ordered products. As yet another example, the customer interface engine 302 may display prompts to help guide the customer to one or more pickup locations, and/or may provide a communication interface to allow the customer to communicate with a retailer associated with a particular order. Further details regarding functionality of the customer interface engine 302 are described below.

The location engine 304 tracks the location of the customer and reports the location to the pickup management system 204. In some embodiments, the location engine 304 may obtain the customer's location from a location service provider 210, or may derive the customer's location based on information received from a location service provider 210. In some embodiments, the location engine 304 may independently determine the location of the customer using any suitable technique, such as dead reckoning, triangulation, manual input, and/or the like. The location engine 304 may also report the location of the customer to other components of the system 200, such as directly to the customer interface engine 302 or to the retailer system 206. In some embodiments, the location engine 304 may report the location of the customer computing device 202 to the pickup management system 204 at times when orders are not currently pending. The pickup management system 204 may determine a predicted path for the customer based on the reported location, and may deliver advertisements to be displayed by the customer interface engine 302, wherein the advertisements are for products available from retailers along the predicted path, and for products that would be available for pickup at a predicted arrival time of the customer at the retailer.

As illustrated, the pickup management system 204 includes an arrival prediction engine 306, a communicator engine 308, a string management engine 310, a direction management engine 312, and an order management engine 314. The arrival prediction engine 306 is configured to receive location information from the location engine 304. The arrival prediction engine 306 may then use the location information to predict a time of arrival for the customer at one or more pickup locations. The arrival prediction engine 306 may use a path generated by the direction management engine 312, generated by the mapping service provider 212, specified by the customer, or from some other source along with the current location of the customer to determine the predicted arrival time. Other sources of information, such as traffic information, weather information, an average speed of travel of the customer or the customer's vehicle, and/or the like, may also be used in generating the predicted arrival time. The arrival prediction engine 306 may be configured to recalculate the predicted arrival time upon receipt of further information, such as a detection of a variance of a location of the customer from the predicted path of travel, detection of a spontaneous and/or unplanned stop, a re-sorting of stop orders, and/or the like.

The communicator engine 308 is configured to provide one or more communication channels between customers and retailers to help facilitate pickup of orders. For example, the communicator engine 308 may relay messages between a given customer and a given retailer regarding the exact pickup location, regarding revisions of the predicted arrival time, and/or any other types of messages. In some embodiments, the communicator engine 308 may provide a layer of anonymity to the customer by shielding the contact information of the customer from the retailer, and only allowing the retailer to contact the customer through the communicator engine 308. This may encourage customers to communicate with retailers, as the customers do not risk further unwanted contact from the retailer after the pickup transaction is completed. In some embodiments, the communication channel provided by the communicator engine 308 may remain usable for a limited amount of time after the pickup transaction is completed, which would allow the customer to contact the retailer in order to, for example, address problems with the product discovered after the pickup transaction is completed, and/or the like. In some embodiments, a provider of the pickup management system 204 may be able to intervene in a communication channel between a customer and a retailer, for example to provide customer service and/or to help ensure a successful pickup.

The direction management engine 312 is configured to provide instructions for how to reach pickup locations. In some embodiments, the instructions as determined by the direction management engine 312 are presented to the customer via the customer interface engine 302 on the customer computing device 202. Even in situations where the customer knows how to reach the retailer from the customer's current location, the instructions may be helpful to direct the customer to a particular pickup location associated with the retailer, such as a particular parking space, a particular side of the street, an approach path, and/or the like. The instructions may direct the customer in a most efficient way to the pickup location, may help improve the accuracy of the predicted arrival time by having the customer travel a known route, and/or the like. In some embodiments, the instructions may not direct the customer directly to the pickup location, but may instead direct the customer to a start of an approach path to the pickup location. For example, the instructions may initially direct the customer to a point one block to the east of the pickup location, so that the customer approaches the pickup location from the east. Multiple such locations may be used, so that the retailer can establish an approach path to the pickup location, such as a path around the block, a horse-shoe path, and/or the like, to manage the path of approach of the customers.

In some situations, the pickup location may not be associated with any one particular retailer but instead will be used by multiple retailers at once (as will be discussed further below), and so the instructions will be useful to the customer to find the common pickup location. In some embodiments, the direction management engine 312 may also be configured to provide instructions to the retailer for how to reach pickup locations. For example, the direction management engine 312 may direct an employee of the retailer to a particular parking space, may direct an employee to a pickup location not associated solely with the retailer but instead used by multiple retailers at once, and/or the like.

The order management engine 314 is configured to accept orders from customers for products, and to process those orders. In some embodiments, the order management engine 314 may be configured to accept orders created by third-party ordering systems, by a web site associated with a brick-and-mortar retailer, and/or the like, instead of directly from customers. The string management engine 310 is configured to build strings of orders, such that multiple products may be picked up from multiple retailers in an efficient manner. Further details of the order management engine 314 and the string management engine 310 are discussed at length below.

As illustrated, the pickup management system 204 also includes a retailer data store 316 and a customer data store

318. As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed packet switched network. However, any other suitable storage technique and/or device capable of quickly and reliably providing the stored data in response to queries may be used, and the computing device may be accessible locally instead of over a network, or may be accessible over some other type of suitable network or provided as a cloud-based service. A data store may also include data stored in an organized manner on a storage medium 908, as described further below. One of ordinary skill in the art will recognize that separate data stores described herein may be combined into a single data store, and/or a single data store described herein may be separated into multiple data stores, without departing from the scope of the present disclosure.

In some embodiments, the retailer data store 316 may be configured to store information associated with a plurality of retailers. For example, the retailer data store 316 may store information associated with each retailer that uses the system 200 including, but not limited to, a location of the retailer, a set of predetermined pickup locations associated with the retailer, contact information for the retailer, a set of products made available by the retailer for pickup, financial account information for the retailer into which payments received from customers are to be submitted, time periods during which the retailer does or does not provide pickup services through the system 200, a maximum rate of orders that the retailer is willing or able to fulfill, and/or the like. In some embodiments, the retailer data store 316 may not be configured to store a set of products made available by the retailer for pickup. Instead, the pickup management system 204 may obtain that information directly from a point-of-sale computing device 324 of the retailer, or from a third-party aggregator of product and/or inventory information, such as Google Product Search and/or the like.

The stored information regarding the set of predetermined pickup locations may include indications of time periods during which the predetermined pickup locations are available. As a nonlimiting example, the stored information may indicate that a parking spot is available as a pickup location all day except for during an afternoon commuting period, during which time the parking spot is a tow away zone. For some retailers, less than all of the information for which the retailer data store 316 is configured to store may be stored in the retailer data store 316. In some embodiments, the retailer data store 316 may provide products for presentation to the customer and subsequent selection, while in other embodiments, the retailer data store 316 may provide a link to a service operated by the retailer from which the customer may select products for pickup.

In some embodiments, the customer data store 318 may be configured to store information associated with a plurality of customers. For example, the customer data store 316 may store information associated with each customer that uses the system 200 including, but not limited to, login information, contact information for the customer, payment account information for the customer, a description of a vehicle associated with the customer, favorite orders previously placed by the customer, and/or the like. The customer data store 316 may also include information about past orders placed by the customer, current orders being processed for the customer, and/or the like.

In some embodiments, the customer data store 316 may be configured to store historical location information for the customer, such that the pickup management system 204 may predict future locations for the customer, and may create or suggest orders based on the customer's predicted future location. As one nonlimiting example, the customer data store 316 may include information describing a typical route the customer takes while commuting, as well as typical times at which the customer travels the typical route. The pickup management system 204 may then place orders (or suggest to the customer that orders be placed) for products that may be easily picked up from pickup locations along the customer's commuting path, at times at which the customer is predicted to be at the pickup locations as part of the customer's commute. As another example, the pickup management system 204 may have access to schedule data for the customer, such that the pickup management system 204 may be able to predict the travel of the customer based on appointments within the customer's schedule.

In some embodiments, the customer data store 316 may be configured to store historical order information for the customer, such that the pickup management system 204 may determine commonly ordered products for the customer and suggest creating orders for such products at appropriate times. As one nonlimiting example, the pickup management system 204 may detect that a customer is browsing a web site and/or other retailer purchasing interface, and may determine based on data stored in the customer data store 318 that the customer tends to have a "usual" order from the retailer. For example, the customer may usually order the same sandwich from a given restaurant. Accordingly, the pickup management system 204 may cause the customer interface engine 302 to display a popup, an alert, or any other suitable interface element to indicate that the customer may create their usual order using the pickup management system 204, and may create such an order upon detecting a click by the customer on the interface element. In some embodiments, the popup may allow the customer to enter an identifier of a customer computing device 202 to be used to consummate the transaction. For example, if the popup is displayed by a customer interface engine 302 executing on a desktop computer, the customer may input a telephone number of a mobile computing device to continue the transaction.

As illustrated, the retailer system 206 includes a retailer interface engine 322 and a preparation queue management engine 320. The retailer interface engine 322 allows employees of retailers to interact with various functionality of the pickup management system 204. For example, employees may use the retailer interface engine 322 to communicate with customers via the communicator engine 308. Employees may also use the retailer interface engine 322 to modify information stored within the retailer data store 316, such as predetermined pickup locations associated with the retailer, a rate at which the retailer is willing or able to fulfill orders, and/or the like. As stated above, the retailer system 206 may include one or more mobile employee computing devices configured to execute portions of the retailer interface engine 322 to help an employee manage communications with customers, consummate pickup meetings, and/or any perform other function associated with the retailer interface engine 322.

In some embodiments, the preparation queue management engine 320 is configured to display orders received from customers such that employees of the retailer may ensure that the orders are prepared and brought to the associated pickup location at a time when the customer is expected to arrive. In some embodiments, the preparation queue management engine 320 may be integrated with automated food preparation machines, and may instruct the automated food preparation machines to begin preparation of the food items at an appropriate time. In some embodiments, the preparation queue management engine 320 may be integrated with a variety of in-store timing mechanisms usable to prompt employees to begin preparing orders at appropriate times. The preparation queue management engine 320 may be configured to receive new orders from the pickup management system 204, and to intelligently reorder a queue presented to employees of the retailer to ensure that each of the orders is completed at the appropriate time.

As illustrated, the retailer may also be associated with a point-of-sale computing device 324. The point-of-sale computing device 324 may be configured to accept orders and payments from a traditional customer already located at the retailer. In some embodiments, the point-of-sale computing device 324 is configured to submit such orders to the preparation queue management engine 320 to be included in the preparation queue along with orders received from the pickup management system 204. In such an embodiment, the retailer may be able to process both traditional orders and orders submitted through the pickup management system 204 in an efficient and timely manner. In some embodiments, the point-of-sale computing device 324 may include inventory management functionality configured to manage inventory at the retailer. In such embodiments, the point-of-sale computing device 324 may be queried by the order management engine 314 to determine available inventory at the retailer. The illustrated point-of-sale computing device 324 should not be seen as limiting the types of devices with which the retailer system 206 and/or the pickup management system 204 may integrate. In some embodiments, the retailer system 206 and/or the pickup management system 204 may integrate with automated product preparation devices (such as automated sandwich-making machines in a restaurant and/or the like), existing preparation queue management systems employed for drive-throughs, kitchen display management, and/or the like, and/or any other suitable device or system.

Figure 4B:
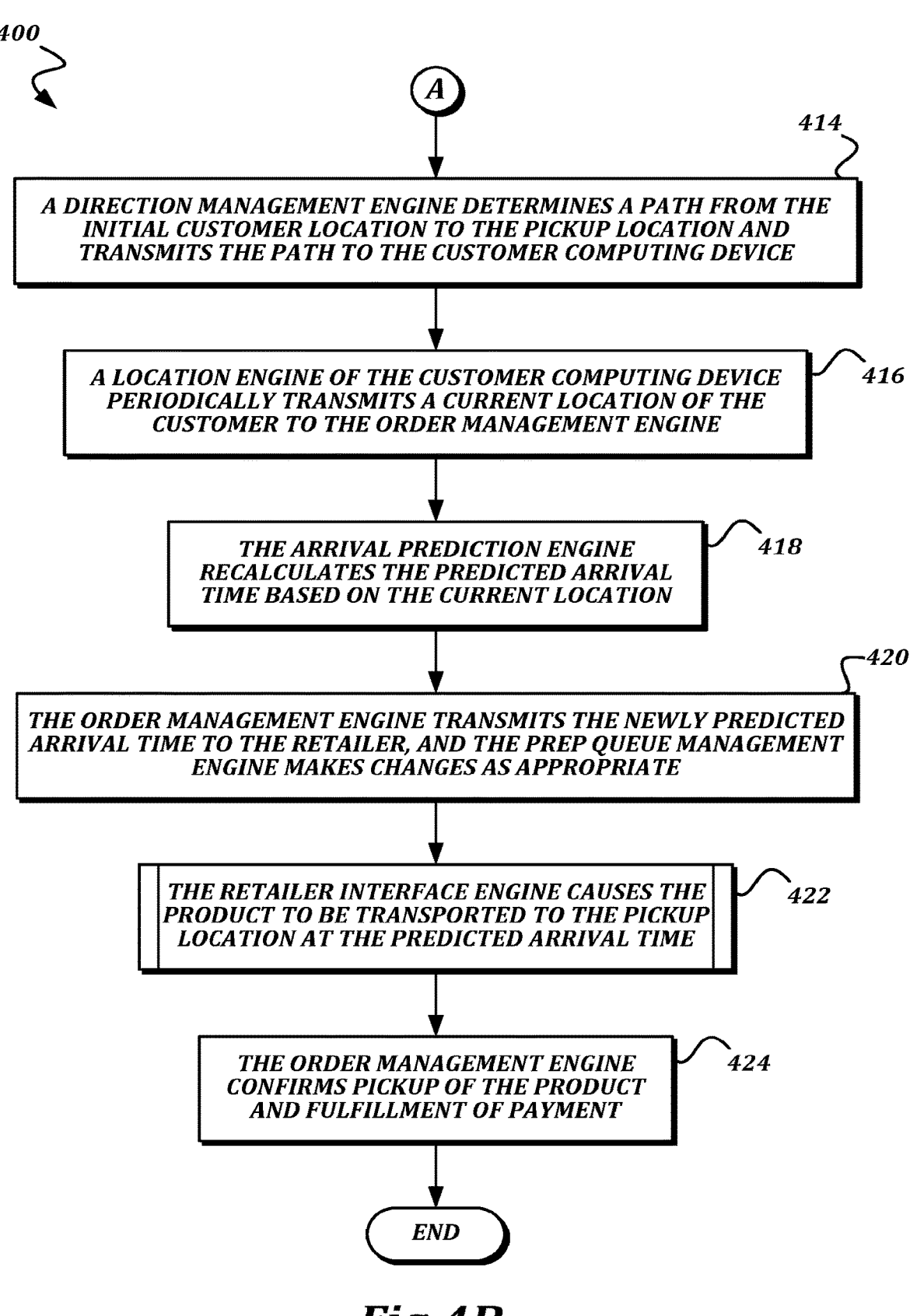

FIGS. 4A-4B are a flowchart that illustrates one embodiment of a method 400 of processing a curb-side delivery request according to various aspects of the present disclosure. The method 400 illustrates an embodiment wherein a customer places a single order with a single retailer. Some embodiments of the system 200 may handle strings of multiple orders fulfilled by multiple retailers. An exemplary method for processing such a string of orders is discussed further below with respect to the method 700 illustrated in FIG. 7.

From a start block (FIG. 4A), the method 400 proceeds to block 402, where an order management engine 314 receives an order request from a customer computing device 202 of a customer, the order request including a product and an initial customer location.

As used herein, the term "product" may include any item offered for sale by a retailer that may be picked up by a customer. In some embodiments, a "product" may include a service to be applied to an item already owned by the customer, such as for dry-cleaning services and/or the like. Though stated in the singular form for ease of discussion, a "product" included in an order may include more than one product or item. As a nonlimiting example, a "product" may include a list of items sold by a hardware store. As another nonlimiting example, a "product" may include a take-out food order, the take-out food order including a group of items from the retailer's menu. As discussed above, the customer may select the product from a list of products presented by the customer interface engine 302, from a web site operated by the retailer, from a third-party ordering portal, or by any other suitable method.

In some embodiments, the order request may be generated in association with an ordering pipeline of a third-party system. As a nonlimiting example, the customer may choose a product for purchase using a web retailer. As part of the checkout pipeline of the web retailer, an option to generate an order request with the pickup management system 204 instead of fulfilling the order using a traditional method, such as via ground shipping, express shipping, and/or the like, may be presented to the user. In this example, the order request may be transmitted to the order management engine 314 by the customer computing device 202, or may be automatically transmitted to the order management engine 314 by the web retailer.

As another nonlimiting example, the customer may place a telephone call to a retailer to determine availability of a product, and the order request may be generated by the retailer or by the customer in association with the telephone call once it is determined that the product is available and the customer wishes to pick up the product from the retailer. In some such embodiments, the customer may be able to interact with an interface control presented by their smart phone to automatically create a link to the retailer and initiate the order via the pickup management system 204 without having to hang up the call.

In some embodiments in which the order is created as part of an order pipeline of a third-party system, the product may have previously been ordered via the third-party system for mail-based delivery, and the creation of an order with the pickup management system 204 may cause the mail-based delivery order to be canceled in favor of the in-person pickup. In some embodiments, the order request may be generated starting with a review of a retailer on a review-oriented web site.

In some embodiments, the order request may be generated after viewing a list of products for a selected retailer as presented by the customer interface engine 302. For example, the customer interface engine 302 may display a map of a route the customer is planning to take, a map of the vicinity of the customer's current location, or any other map. The map may indicate one or more retailers that are enabled to accept orders from the pickup management system 204. The customer may select one of the retailers from the map, and a list of products available at the selected retailer (or a "usual" order previously placed with the retailer) may then be displayed for selection.

In some embodiments, the retailer may configure a minimum pre-order time for particular products to give the retailer ample time to prepare the products for delivery. In such embodiments, the direction management engine 312 may determine predicted travel times to retailers, and may eliminate retailers from consideration if the customer is expected to arrive before the minimum pre-order time has elapsed, or may display a prompt indicating the earliest time the product could be prepared and delivered by the retailer.

In some embodiments, order requests may be generated automatically by the order management engine 314 based on other sources of information available to the order management engine 314. In some embodiments, the customer data store 318 may be configured to store inventory lists, wish lists, or other information indicating a desire by the customer to obtain a product at some point in the future. The order management engine 314 may detect a drop in inventory below a certain level, at which point an order may be automatically generated by the order management engine 314 (or the customer may be prompted to generate or accept such an order). As a nonlimiting example, an inventory list may keep track of a number of eggs the customer has in his refrigerator. Once the number of eggs falls below a predetermined level, the order management engine 314 may automatically generate an order that includes eggs, so that the customer may pick up the eggs on his way home from work and thereby not run out. As another nonlimiting example, a wish list may include a rare type of light bulb that is only available from a limited number of retail locations. The order management engine 314 may detect when a customer is predicted to pass within a predetermined radius of a retailer that carries the rare light bulb, and an order including the rare light bulb may be automatically generated by the order management engine 314 so that the customer does not have to go out of her way to visit the retailer. Creation of the automatically generated order may take into account preparation times with respect to when the customer is expected to be in the vicinity of the retailer, and said preparation times may be used to influence search results and preferred choices.

In some embodiments, the order request may not be generated immediately upon selection of the product and/or retailer, but instead may be stored by the order management engine 314 without taking further action until an appropriate time, such as upon detection that the customer is within a predetermined proximity to the retailer, upon detection that the customer has begun traveling away from the initial customer location, upon a predetermined time at which the customer indicated they would be leaving the initial customer location, upon a determination that the retailer would be able to prepare and deliver the product to a likely pickup location by the predicted arrival time, and/or the like.

The method 400 then proceeds to block 404, where the order management engine 314 determines a retailer location for fulfilling the order request. In some embodiments, the retailer location may be chosen by the order management engine 314 based on the initial customer location. For example, the order management engine 314 may choose a retailer location that carries the product that is closest to the initial customer location, based on information about retailer inventories stored in the retailer data store 316. In some embodiments, the retailer location may be chosen by the customer. For example, the customer interface engine 302 may present a set of retailers able to provide the product to the customer via any suitable method, such as in a list, on a map of the vicinity of the initial customer location, on a map displaying a path of travel indicated by the customer, and/or the like. The customer interface engine 302 may then process a selection of a retailer in the set of retailers by the customer, and may provide the selected retailer to the order management engine 314.

Next, at block 406, an arrival prediction engine 306 determines a predicted arrival time for the customer to arrive near the retailer location. As a precise pickup location may not have yet been determined, the arrival prediction engine 306 may determine a predicted arrival time for the customer to arrive within a predetermined radius of the retailer location, or to the retailer location itself. In some embodiments, the arrival prediction engine 306 may contact a mapping service provider 212 to determine a path from the current location of the customer to the retailer location, or to a point within the predetermined radius from the retailer location. The arrival prediction engine 306 or the mapping service provider 212 may then use this path information along with predicted rates of travel for segments of the path to determine the predicted arrival time. In some embodiments, traffic information may also be used to determine predicted rates of travel for the segments of the path. In some embodiments, the arrival prediction engine 306 may receive a predicted arrival time entered by the customer, and may determine that the time entered by the customer should be used instead of the automatically predicted arrival time. In some embodiments, the arrival prediction engine 306 may base the predicted arrival time on an intended time of departure provided by the customer. That is, the arrival prediction engine 306 may determine how long it will take the customer to travel the path to the retailer location, but may then delay the time of departure to a time specified by the customer in order to generate the predicted arrival time. In such an embodiment, the arrival prediction engine 306 may use predicted traffic information for the time in which the customer will actually be traveling the path, as opposed to currently sensed traffic information.

The method 400 then proceeds to block 408, where the order management engine 314 transmits an order notification to the retailer at the retailer location, the order notification including an identification of the product and the predicted arrival time. At block 410, a preparation queue management engine 320 of the retailer receives the order notification and inserts the product into a preparation queue to be ready at the predicted arrival time. In some embodiments, the preparation queue management engine 320 may insert the product at the end of the preparation queue, and the queue may be processed in a first in, first out (FIFO) manner. In some embodiments, the preparation queue management engine 320 may determine a preparation time for the product, and may insert the product into the preparation queue in a place where the new product and all existing products will be completed on time. As a nonlimiting example, if a product already in the preparation queue is being prepared for an expected arrival time thirty minutes in the future, but will only take five minutes to prepare, the preparation queue management engine 320 may place a new product that takes ten minutes to prepare for an expected arrival time fifteen minutes in the future before the preexisting product.

In some embodiments, the preparation queue management engine 320 may determine the preparation time based on preparation times for multiple items included within the product, and may determine the preparation time based on having multiple employees work on preparing the product at the same time. For example, multiple employees may be tasked to retrieve various items included in the product from a warehouse or stockroom. As another example, one employee may prepare an entree for a take-out food order, while another employee may prepare accompanying side dishes. In such examples, the preparation queue management engine 320 may calculate the time to prepare the product based on the employees working in parallel. In some embodiments, the preparation queue management engine 320 may use machine learning techniques to determine preparation times based on factors including, but not limited to, a pace of a kitchen on a given day, an amount of pending orders, a general time of day noting periods of increased activity, complexity of items ordered, identified bottlenecks in a preparation pipeline, historical performance of employees, actual preparation times when compared to predicted preparation times, and/or the like. In some embodiments, the predicted preparation time may be uncertain or significantly long, and an employee may create a notification using the retailer interface engine 322 to confirm that the order is ready to be picked up, said notification being transmitted to the customer computing device 202.

In some embodiments, the preparation queue management engine 320 may automatically determine, upon receiving the order notification, that the order cannot be prepared in time for the predicted arrival of the customer. In some embodiments, the preparation queue management engine 320 may work with the order management engine 314 to govern a rate at which orders are accepted by the retailer system 206. For example, the retailer may only be able to fulfill a limited number of pickup orders at a time, or there may only be a limited number of reasonably serviceable pickup locations in the vicinity of the retailer. Accordingly, the preparation queue management engine 320 may be configurable to only accept order requests from the order management engine 314 at a predetermined rate, beyond which the retailer would appear unavailable to service further order requests from the pickup management system 204. In some embodiments, orders that are received faster than the desired rate may be accepted by the preparation queue management engine 320, but a notification may be sent to the customer that there may be a delay before the order is ready to be picked up.

In some embodiments, the preparation queue management engine 320 may determine a preparation time for a received order notification, and may determine that, given a number of orders already in the preparation queue, the retailer would not be able to fulfill the order by the predicted arrival time while also successfully servicing the orders that are already in the preparation queue. In some embodiments, an employee of the retailer may determine that the retailer simply does not want to fulfill the order for some other reason. Accordingly, the actions described in block 408 with respect to adding the product to the preparation queue may be skipped, and a rejection notice may be transmitted by the retailer system 206 to the order management engine 314.

In the illustrated embodiment, it is assumed that the order was accepted and the product was successfully inserted into the preparation queue. Therefore, the method 400 proceeds to block 412, where the order management engine 314 receives an order acknowledgement from the retailer, the order acknowledgement including a pickup location. In some embodiments, the pickup location may be a general area in the vicinity of the retailer, such as a loading zone on the street in front of the retailer. In some embodiments, the pickup location may be more precise, such as a particular parking space, a drive-through lane, a pickup window, and/or any other suitable location. In some embodiments, the precise pickup location may be selected by an employee, such as by indicating the pickup location on a map displayed by the retailer interface engine 322. In some embodiments, the pickup location may be automatically determined by the preparation queue management engine 320. The preparation queue management engine 320 may retrieve a list of pickup locations associated with the retailer from the retailer data store 316, and may assign a pickup location based on factors such as a direction from which the customer is expected to approach, whether a precise pickup location is already expected to be used by another customer at the predicted arrival time, and/or the like. In some embodiments, once selected, the pickup location may be reserved to prevent others from using the pickup location before the order is delivered, such as by displaying a sign identifying the customer and/or the like. In some embodiments, the retailer system 206 may not specify a particular pickup location, but may alert the customer if there are certain areas near the retailer that are not available as a pickup location, such as loading zones that are tow-away zones during certain parts of the day. In some embodiments, the customer may select a preferred pickup location via a map or list presented by the customer interface engine 302.

In some embodiments, the retailer system 206 may communicate with a third-party parking space location/management system to determine pickup locations in the area that are expected to be free at the predicted arrival time. The retailer system 206 may also provide remuneration to the third-party parking space location/management system when parking spaces managed by the system are used as pickup locations.

In some embodiments, more than one precise pickup location may be specified in the order acknowledgement. For example, the order acknowledgement may include a primary pickup location, and may also include one or more fallback pickup locations that may be used if the customer arrives and finds that the primary pickup location is unexpectedly unavailable for any reason.

The method 400 then proceeds to a continuation terminal ("terminal A"). From terminal A (FIG. 4B), the method 400 proceeds to block 414, where a direction management engine 312 determines a path from the initial customer location to the pickup location and transmits the path to the customer computing device 202. In some embodiments, the customer interface engine 302 may present the path to the customer, may present driving direction prompts to the customer, or may otherwise guide the customer along the path to the pickup location. In some embodiments, the direction management engine 312 may receive the path from a mapping service provider 212 upon transmitting the initial customer location and the pickup location to the mapping service provider 212. In some embodiments, the direction management engine 312 may reuse portions of the path used by the arrival prediction engine 306 to predict the arrival time in determining the path to transmit to the customer computing device 202.

In some embodiments, determination of the path may depend on particular features of the precise pickup location. As a nonlimiting example, the direction management engine 312 may ensure that the path approaches the pickup location from a proper direction, such that the customer will be on the correct side of the street to easily park in at the pickup location. As another nonlimiting example, the direction management engine 312 may prefer right turns over left turns to approach the pickup location (assuming driving on the right-hand side of the street), in order to make the approach to the pickup location easier for the customer.

In some embodiments, the path may be determined by the direction management engine 312 based on input from the customer or an employee of a retailer. As a nonlimiting example, the customer may trace a path on a map displayed by the customer interface engine 302, and the path traced by the customer may be used as the basis for the path determined by the direction management engine 312. As another nonlimiting example, the employee may trace a path on a map displayed by the retailer interface engine 322 to indicate a preferable approach to the pickup location.

In some embodiments, the path determined by the direction management engine 312 may be influenced by settings provided by the customer. For example, the direction management engine 312 may attempt to determine a path that is shortest, fastest, affected the least by traffic, and/or the like, as specified by the customer. In some embodiments, the direction management engine 312 may determine the path based on desires of the retailer. As one nonlimiting example, the retailer may specify an approach pattern intended to space out customers arriving at a pickup location. Hence, the determined path might not be the most direct path, but would instead place the customers in a line or other formation as they approach the pickup location. As another nonlimiting example, the path may be longer than the shortest path, may take a greater amount of time than the quickest path, or may instruct the customer to delay starting along the path in order to give the retailer more time to prepare the product before the expected arrival time.

At block 416, as the customer approaches the pickup location, a location engine 304 of the customer computing device 202 periodically transmits a current location of the customer to the order management engine 314. In some embodiments, the location engine 304 may periodically transmit the current location of the customer to the order management engine 314 at a repeating time interval. In some embodiments, the location engine 304 may monitor the current location of the customer with respect to the path received from the direction management engine 312, and may only transmit the current location of the customer to the order management engine 314 if the location has departed substantially from the path, if the location is substantially different from a location on the path that would be expected at the current time, and/or the like.

At block 418, the arrival prediction engine 306 recalculates the predicted arrival time based on the current location received from the location engine 304. At block 420, the order management engine 314 transmits the newly predicted arrival time to the retailer, and the preparation queue management engine 320 makes changes as appropriate. In some embodiments, if the newly predicted arrival time is not materially different from the previously predicted arrival time, the preparation queue management engine 320 may ignore the new time, or the arrival prediction engine 306 may not send the newly predicted arrival time to the preparation queue management engine 320.

If the preparation queue management engine 320 determines that the newly predicted arrival time is materially different, the preparation queue management engine 320 may change the order of items in the preparation queue, and may display an alert to an employee indicating the change. For example, if the newly predicted arrival time is sooner than the previously predicted arrival time, the corresponding entry in the preparation queue may be moved closer to the front of the queue so that it will be completed by the newly predicted arrival time. As another example, if the newly predicted arrival time is later than the previously predicted arrival time, the corresponding entry in the preparation queue may be moved closer to the end of the queue so that other entries will be addressed first. In some embodiments, the preparation queue management engine 320 may direct employees of the retailer to move completed items from one order to another order after requeuing to help successfully complete all orders. For example, if two orders in a preparation queue contain cheeseburgers, and a later order for which the cheeseburger has not yet been prepared is bumped ahead of an earlier order for which the cheeseburger has been prepared, the preparation queue management engine 320 may direct an employee to use the prepared cheeseburger to fulfill the order which was bumped ahead, rather than the order for which the cheeseburger was originally prepared.

In some embodiments, the preparation queue management engine 320 may take other actions upon determining that the newly predicted arrival time is materially different. For example, if the newly predicted arrival time is later than the originally predicted arrival time, the preparation queue management engine 320 may cause the customer interface engine 302 to display a prompt to the customer indicating how late the customer is in the hope of encouraging the customer to continue on the path or to prepare the customer for the possibility that their order may be prepared and waiting for them longer than would be desirable. Such prompts may be displayed at particular intervals, such as when the customer is five minutes late, ten minutes late, and/or the like. As another example, if the newly predicted arrival time is earlier than the originally predicted arrival time, the preparation queue management engine 320 may cause the customer interface engine 302 to display a prompt to the customer indicating how early they are likely to arrive, and that they may have to wait at the pickup location for preparation and delivery of the order to be completed. In some embodiments, similar prompts may be presented by the retailer interface engine 322.

As will be understood by one of ordinary skill in the art, the actions described with respect to block 416 and block 418 relating to recalculating a predicted arrival time and making appropriate changes to the preparation queue may be performed multiple times before the method 400 proceeds further.

At procedure block 422, a procedure is performed wherein the retailer interface engine 322 causes the product to be transported to the pickup location at the predicted arrival time. In some embodiments, the retailer system 206 may strive to cause the product to be transported to the pickup location as close to the predicted arrival time as possible. In some embodiments, the preparation queue management engine 320 may instruct employees of the retailer to have the order prepared at a time as close to the predicted arrival time as possible that still allows an employee to take the ordered product to the pickup location by the predicted arrival time, taking into account an amount of time it will take the employee to reach the pickup location from the retailer.

In some embodiments, the procedure may include a prompt being displayed by the retailer interface engine 322 at a time when the employee should depart with the order to the pickup location. In some embodiments, the display of the prompt may occur before the predicted arrival time so that the employee may arrive at the pickup location at the predicted arrival time. In some embodiments, the prompt may not be displayed until a confirmation is received that the customer has arrived at the pickup location, such as verifying a location transmitted by the location engine 304, verifying an arrival confirmation transmitted through the customer interface engine 302, and/or the like. The type of prompt displayed or timing of the prompt displayed may be configurable by the retailer. In some embodiments, the departure of the employee may be timed to coincide with the predicted arrival time, and a penalty fee may be assessed to the customer if the customer has not arrived by the predicted arrival time. In some embodiments, a discount may be applied to the order if it is not brought to the pickup location by the original predicted arrival time.

In some embodiments, the predicted arrival time or the time at which the prompt may be displayed may be skewed to help ensure efficiency for either the customer or the retailer. For example, the prompt may be displayed so that the employee arrives at the pickup location before the customer, so that the customer does not have to wait for the employee. Conversely, in another example, the prompt may be displayed so that the customer arrives at the pickup location before the employee, so that the employee does not have to wait for the customer to arrive and so that the order may be at maximum freshness when given to the customer.

In some embodiments, the prompt displayed to the employee may include information to help facilitate the rendezvous with the customer. For example, the prompt may include information such as a map displaying a path to the pickup location, a description or picture of the customer's vehicle, an expected direction of approach for the customer, a general area in which the customer is expected to stop such as a proper side of the street, and/or the like. A detailed description of a procedure suitable for use in procedure block 422 that involves employees using wearable computing devices to interact with the retailer interface engine 322 is provided below.

Once the employee and the customer are both at the pickup location, the employee transfers the product to the customer. In some embodiments, the employee may use a mobile employee computing device executing portions of the retailer interface engine 322 to obtain a signature, payment, or other verification from the customer that the product was delivered. The method 400 then proceeds to block 424, where the order management engine 314 confirms pickup of the product and fulfillment of payment. In some embodiments, payment for the product may be obtained by the employee from the customer at the pickup location, such as by swiping a credit card using the mobile employee computing device, verifying a cash payment using the mobile employee computing device, and/or the like. In some embodiments, payment for the product may be obtained via the customer interface engine 302 during the initial order creation, such that time and effort may be saved at the point of pickup. In such an embodiment, the employee may simply use the mobile employee computing device to verify with the retailer interface engine 322 that the payment had previously been made. Further, such an embodiment may provide the employee with an option to accept a gratuity or other extra payment from the customer via the mobile employee computing device at the time of pickup. In some embodiments, payment may be obtained at other times, such as during the travel route, after the pickup, and/or at any other suitable time. In some embodiments, the retailer system 206 may be configured to automatically charge an account using information that the retailer system 206 has on file. In some embodiments, accepting payment may include applying loyalty points, targeted discounts, or other non-monetary values towards the cost of the product. The method 400 then proceeds to an end block and terminates.

Figure 5:
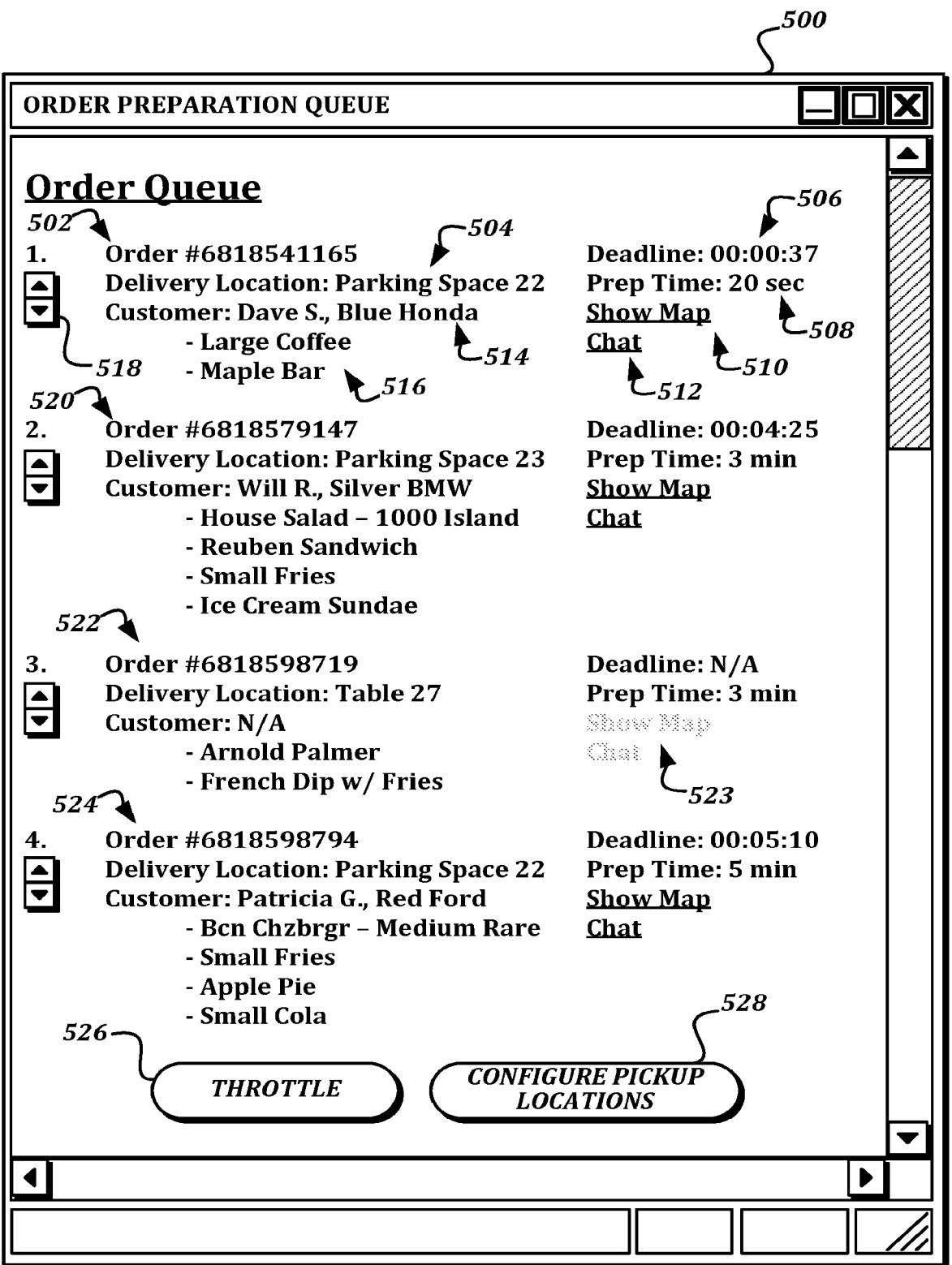
FIG. 5 illustrates an exemplary embodiment of an interface presented by the retailer interface engine to show an order preparation queue, according to various aspects of the present disclosure.

FIG. 5 illustrates an exemplary embodiment of an interface 500 presented by the retailer interface engine 322 to show an order preparation queue according to various aspects of the present disclosure. As illustrated, the interface 500 is presented as a web page displayed by a standard web browser. In other embodiments, the interface 500 may be presented via a custom application running on a standard operating system, an application running on a customized operating system having limited functionality, a device specifically configured to only present the interface 500, an application executing on a device separate from the display and presented via a dumb terminal, and/or via any other suitable mechanism. As illustrated, the interface 500 displays information associated with a first order 502, a second order 520, a third order 522, and a fourth order 524. Each of the orders displays exemplary information for a preparation queue associated with a restaurant.

The interface 500 may include a pickup location specification 504, a predicted arrival time display 506, a preparation time display 508, a map interface control 510, a communicator interface control 512, a customer vehicle description 514, and product details 516 for each order. The particular format for each of these pieces of information may be altered in some embodiments. For example, as illustrated, the predicted arrival time display 506 is presented as a countdown timer. In other embodiments, the predicted arrival time display 506 may present the predicted arrival time as a time of day, and/or in any other suitable method. In some embodiments, actuating the map interface control 510 may cause a map of the area, including an indication of the associated pickup location, to be presented to the employee. The map of the area presented to the employee may allow the employee to specify a new pickup location. In some embodiments, actuating the communicator interface control 512 provides access to the communication channel maintained by the communicator engine 308 between the retailer system 206 and the customer computing device 202. The customer vehicle description 514 may include any information that would help identify the customer, such as a customer name; a make, color, and/or license plate of a vehicle; and/or the like.

As illustrated, the third order 522 is not associated with an order submitted by the pickup management system 204, but is instead an order received locally at the retailer. The interface 500 may present such an order along with the orders from the pickup management system 204 so that all types of customers of the retailer may be serviced in a timely manner using the same preparation queue. For such an order, certain options, such as the show map and chat interface controls 523 may be disabled.

In some embodiments, the orders may include a reordering interface control 518. The reordering interface control 518 may allow employees of the retailer to change the order of elements in the preparation queue to override the automatic ordering provided by the preparation queue management engine 320. For example, in the illustrated embodiment, an employee might use the reordering interface control associated with the third order 522 to bump the third order 522 down below the fourth order 524, if the customer associated with the third order 522 is likely to be able to wait until the fourth order 524 has been fulfilled without having an unsatisfactory experience. The employee may use the displayed preparation times to determine orders which may be shuffled in the preparation queue.

In some embodiments, the interface 500 may not display all orders being managed by the preparation queue management engine 320. For example, some orders that have predicted arrival times far in the future may not be displayed in the interface 500 in order to reduce visual clutter and/or for other reasons.

As illustrated, the interface 500 includes a throttle interface control 526. The throttle interface control 526 may cause an interface to be presented in which an employee may change the rate at which the retailer system 206 indicates it is willing to accept orders from the pickup management system 204. The throttle interface control 526 may include settings for pacing, order caps, volume preferences, bundling, spacing, and/or the like. The changed rate may be reported to the pickup management system 204. If the change in rate is large, the order management engine 314 may change the rate at which orders are directed to the retailer system 206. If the change in rate is small, the direction management engine 312 may change the paths on which the customers are directed to space out the predicted arrival times by a greater amount. The illustrated interface 500 also includes a pickup location interface control 528.

The pickup location interface control 528 may cause an interface to be presented in which an employee may alter a set of pickup locations stored in the retailer data store 316 as associated with the retailer.

Figure 6:
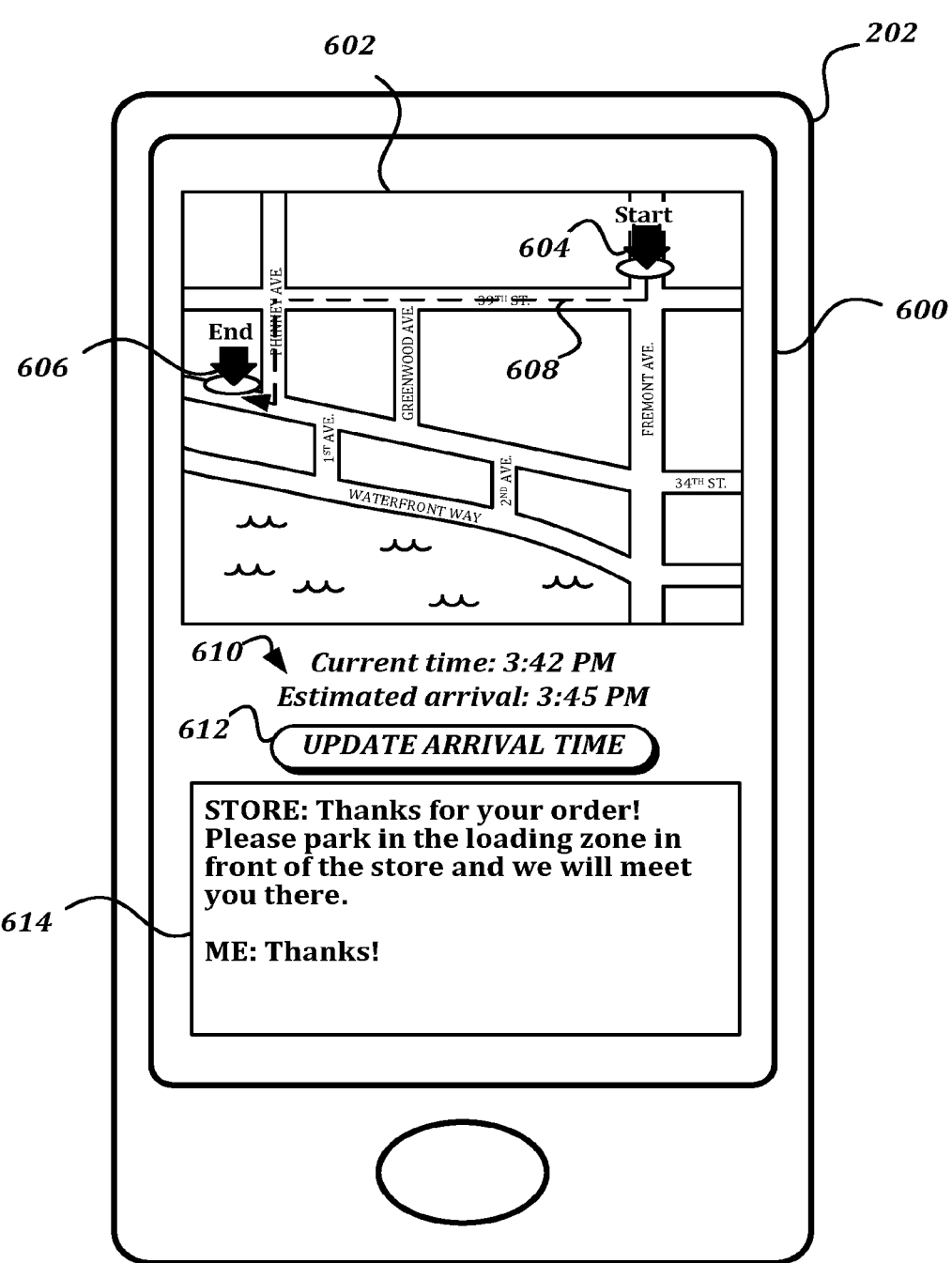
FIG. 6 illustrates an exemplary embodiment of an interface presented by a customer interface engine of a customer computing device according to various aspects of the present disclosure.

FIG. 6 illustrates an exemplary embodiment of an interface 600 presented by a customer interface engine 302 of a customer computing device 202 according to various aspects of the present disclosure. As illustrated, the interface 500 is presented by a custom application running on a smart phone. In some embodiments, the interface 500 may be presented in any other suitable manner, such as via a web interface presented by a standard web browser, on a different type of computing device, and/or the like. As illustrated, the interface 600 includes a map 602, a start location 604, an end location 606, and a path 608. In some embodiments, the end location 606 may indicate the precise pickup location, or may indicate the retailer and any location in the vicinity of the retailer may be used as the pickup location. In some embodiments, the map 602 may scroll along with the movement of the customer as the customer approaches the end location 606. In some embodiments, the map 602 may provide a zoomed-in view of the end location 606 as the customer approaches, and may indicate a precise pickup location (such as a particular parking space) on the zoomed-in view.

In the illustrated embodiment, arrival time prediction information 610 and an arrival time update interface control 612 are presented. The arrival time prediction information 610 shows information to the customer relating to when the retailer system 206 expects the customer to arrive, and may be presented in any suitable format. The customer may use this information to alter his pace towards the end location 606 in order to arrive at the predicted time. Interacting with the arrival time update interface control 612 may cause an interface to be presented wherein the customer may change the predicted arrival time. The customer may wish to change the predicted arrival time based on information that is not available to the arrival prediction engine 306, such as an additional stop not tracked by the pickup management system 204, a delayed departure time, a recent change in traffic, and/or the like. In some embodiments, the interface may allow the customer to cancel the order, if the cancellation request is submitted before some critical time that may be displayed to the customer (such as a time at which the order is being prepared by an employee or within a predetermined amount of time before the predicted arrival time). In some embodiments, the interface 600 may allow other changes to be made to the order, such as delaying the predicted arrival time by predetermined or other amounts, re-sorting stops along the path for a string (as discussed further below), and/or the like. In some embodiments, the interface 600 may allow the customer to swipe a finger along a street near the retail location displayed on the map 602, or to select a cardinal point on a compass or other display in order to indicate a preferred direction of approach.

In the illustrated embodiment, a communicator pane 614 is provided. In some embodiments, the communicator pane 614 is used by the customer to access the channel provided by the communicator engine 308 between the retailer and the customer computing device 202. In some embodiments, the communicator pane 614 may allow the customer to open additional channels to the retailer, such as voice channels, video channels, and/or the like.

FIG. 7 is a flowchart that illustrates an exemplary embodiment of a method 700 of managing a string of pickups according to various aspects of the present disclosure. In some embodiments, a "string" of pickups may include picking up orders fulfilled by multiple retailers all in one trip. Scheduling multiple pickups in a single string may provide various efficiencies, such as being able to obtain diverse products while automatically planning trips between the various retailers that provide the products, and while still obtaining the benefits of the single pickup described above with respect to the method 400 outlined in FIGS. 4A-4B. In some embodiments, strings may be created with minimal or no user intervention. For example, the pickup management system 204 may build a string that includes errands to be run from a to-do list or a shopping list, and may push a notification that the string has been created to the customer computing device 202.

From a start block (FIG. 7), the method 700 proceeds to block 702, where a string management engine 310 receives a string request from a customer, the string request including customer location information and a set of products. In some embodiments, the string request may be submitted by the customer via the customer interface engine 302. In some embodiments, the customer location information may include a path which the customer intends to travel, specified by the customer tracing the path along a map presented by the customer interface engine 302. The string management engine 310 may determine the set of products based on a list of desired products specified by the customer and a set of products known to be available from retailers near the path which the customer intends to travel. In some embodiments, the customer location information may include only an initial customer location. In some embodiments, the customer location information may include a start location and an end location, and the string management engine 310 may infer a path which the customer intends to travel by requesting such a path from the mapping service provider 212.

Next, at block 704, the string management engine 310 determines a set of retailers providing the set of products based on the customer location information. In some embodiments, the string management engine 310 may query the retailer data store 316 to determine a set of retailers that provide the products of the set of products, and may then choose retailers from that set of retailers based on the customer location information. In some embodiments, the string management engine 310 may query the retailer data store 316 to find a set of retailers based on the customer location information (for example, a set of retailers within a predetermined distance from the intended path of travel), and may then submit queries to each of those retailers to determine availability of one or more of the products of the set of products at the retailers, and an expected preparation time for the products that the retailers do have available.

The string management engine 310 may select the retailers via any suitable criteria. For example, if more than one retailer provides a given product, the string management engine 310 may choose a retailer that is closest to the intended path of travel, that is closest to another retailer providing another product, that offers the given product for the lowest price, that will be able to provide the product with the least manual or automated preparation time, and/or the like. As another example, the string management engine 310 may exclude retailers that are beyond a predetermined distance from the intended path of travel, beyond a predetermined distance from the start location or the end location, and/or the like. In some embodiments, the string management engine 310 may cause the customer interface engine 302 to present a list of retailers to the customer or to present the retailers to the customer on a map, and may allow the customer to choose specific retailers for the string via the customer interface engine 302. In some embodiments, if no retailers are available for a given product that satisfy all of the selection criteria, the string management engine 310 may exclude that product from the string, or may abort attempting to arrange the string and cause an error message to be displayed to the customer. In some embodiments, the string management engine 310 may automatically select the retailers based on one or more preferences for the string specified by the customer, including, but not limited to, minimizing travel cost, minimizing travel time, minimizing travel distance, minimizing product cost, choosing favored retailers over nonfavored retailers, minimizing a number of pickup locations, and/or the like. In some embodiments, the string management engine 310 may insert retailers into the string upon being informed by the retailer that a product is ready for pickup. For example, a dry-cleaning service may inform the pickup management system 204 that a cleaning order is ready for pickup, and so the dry-cleaning service would be added to the string. In some embodiments, the string management engine 310 may choose retailers by considering an overall efficiency for the string, and may choose one retailer over another retailer that, alone, may be more efficient but would be less efficient overall in the string. For example, a coffee shop may be located directly on a predicted path of travel, but a preparation time may be too long to fulfill an order when the customer is expected to be there. The string management engine 310 may instead choose a coffee shop a bit further from the predicted path of travel or later in the path of travel that would be able to fulfill the order in time for the expected arrival of the customer.

At block 706, the string management engine 310 determines a set of pickup locations based on the set of retailers. In some embodiments, the string management engine 310 may request a pickup location specified by each retailer. In some embodiments, the string management engine 310 may take the pickup locations specified by each retailer and determine whether two or more of the pickup locations may be merged into a single combined pickup location. Pickup locations may be merged into combined pickup locations if it is determined that it would be more efficient to combine the pickup locations, such as if the pickup locations were within a predetermined distance of one another and/or the like. In some embodiments, the combined pickup locations would be transmitted to retailers for whom their previously specified pickup locations were combined. Those retailers may then have an opportunity to veto the combined pickup location and return to the separate pickup locations. In some embodiments, vetoing the combined pickup location may cause the string management engine 310 to reconsider whether fulfilling a product ordered from the vetoing retailer would be more efficiently fulfilled via a different retailer that would not veto a combined pickup location. In some embodiments, the string management engine 310 may recognize that pickup locations for some products or retailers may not be mergeable, such as for products that are too difficult to transport to a different pickup location (such as situations where the only suitable pickup location is a loading dock, service area, and/or the like) or products for which freshness is a priority (such as hot food).

Next, at block 708, the direction management engine 312 determines a path from an initial customer location that includes each of the set of pickup locations. In some embodiments, the path determined by the direction management engine 312 may be similar to a path initially specified by the customer. In some embodiments, the path determined by the direction management engine 312 may be based on the path initially specified by the customer, but may be modified to have the pickup locations noted, or to pass through the pickup locations. In some embodiments, the direction management engine 312 may request the path from the mapping service provider 212 based on at least the initial customer location and the set of pickup locations. In some embodiments, the order of the pickup locations or the path may be altered by the customer via the customer interface engine 302, and such alterations may be considered by the direction management engine 312 while determining the path. In some embodiments, such reordering may also take place while the customer is traveling along the path, and each of the retailers would be updated accordingly.

The method 700 then proceeds to block 710, where the order management engine 314 processes an order for each product in the set of products using retailers and pickup locations chosen by the string management engine 310. One of ordinary skill in the art will recognize that each order may be processed using actions similar to those discussed above with respect to blocks 402 through block 412 of the method 400 described in FIGS. 4A-4B, though the retailers, products, and pickup locations will already have been chosen by the string management engine 310. Further, the method 400 would be slightly altered in that, for a given pickup location, the arrival prediction engine 306 may use a predicted arrival time at a previous pickup location and an amount of time expected to be spent at the previous pickup location in order to predict the arrival time at the given pickup location. In some embodiments, the arrival prediction engine 306 may cause the order of the pickup locations to be changed as predicted arrival times change, as new information is received regarding preparation times, and/or for any other suitable reason.

Next, at block 712, the direction management engine 312 transmits the path for presentation to the customer. Again, the actions taken for transmission of the path for presentation to the customer may be similar to the actions discussed above with respect to block 416 of the method 400, though one of ordinary skill in the art will recognize that the path had already been determined at least in part by the string management engine 310, and that more than one pickup location may be presented to the customer.

At block 714, the order management engine 314 processes pickup of each product of the set of products. The actions taken for processing pickup of each product of the set of products may be similar to the actions discussed above with respect to block 416 through block 424 of the method 400 discussed above, though the customer's progress will be tracked along the entire path and predicted arrival times may be generated and updated for each pickup location.

Once all of the pickups have been processed, the method 700 proceeds to an end block and terminates.

While embodiments in which a pickup location is outside of a retail location are primarily described above, these embodiments should be seen as exemplary only. In some embodiments, the pickup location might be within the retailer, and the customer might be instructed to leave their vehicle and to enter the retailer. Though this does appear more like a traditional take-out or pickup scenario, the system 200 may still provide benefits in that the order may be prepared to be ready for pickup as soon as the customer arrives, and the customer may be guided to an easily accessible parking location in close proximity to the retailer. In some embodiments, the pickup location within the retailer might include a storage locker that holds the prepared product, in which case the customer interface engine 302 may present instructions to the customer for accessing the storage locker.

In some embodiments, groups of retailers may collaborate to provide employees that will fulfill pickup orders from multiple retailers. For example, in one embodiment, a group of stores within a mall may each operate separate retailer systems 206, but the mall itself may provide runners equipped with mobile employee computing devices capable of communicating with any of the separate retailer systems 206. Such a system could direct customers to parking spots in the mall parking lot (or other suitable pickup location in the vicinity of the mall, such as a pickup queue, loading dock, and/or the like), and the runners would gather completed orders from each of the stores within the mall before bringing them to the customer in the parking lot.

In some embodiments, multiple retailer systems 206 operated by separate retailers may communicate in order to avoid conflicts. As a nonlimiting example, if a first retailer and a second retailer were located on the same block, both may be interested in designating a parking spot in the middle of the block as a pickup location. Hence, the retailer system 206 of the first retailer and the retailer system 206 of the second retailer may communicate to ensure that both retailers have not scheduled a pickup using the pickup location at the same time. In some embodiments, if a conflict is detected, the retailer system 206 of the first retailer and the retailer system 206 of the second retailer may communicate to move one of the pickups to a backup pickup location, or may recommend a delay to one of the customers so that both may use the same pickup location at different times.

In some embodiments, the customer may travel using a prescheduled mode of transportation, such as a train, a bus, and/or the like. In such an embodiment, the exact path and location of the customer may be determined by consulting bus/train schedules, bus/train locating services, GPS, combinations of the above, and/or the like. In such an embodiment, instead of using a path specified by the user or obtained from a mapping service provider 212, the pickup management system 204 may use the information relating to a bus or train that the customer is known to have boarded (or is known to be boarding in the future) to generate a path, a predicted arrival time, automatically generated orders, and/or the like. In some embodiments, the pickup management system 204 may be integrated with a ride-summoning service such as Taxi Magic, Uber, and/or the like, in order to arrange for transportation for the customer. In such an embodiment, the summoned vehicle may include a customer computing device 202 that receives information to associate the summoned vehicle with the pickup or pickups.

Figure 8:
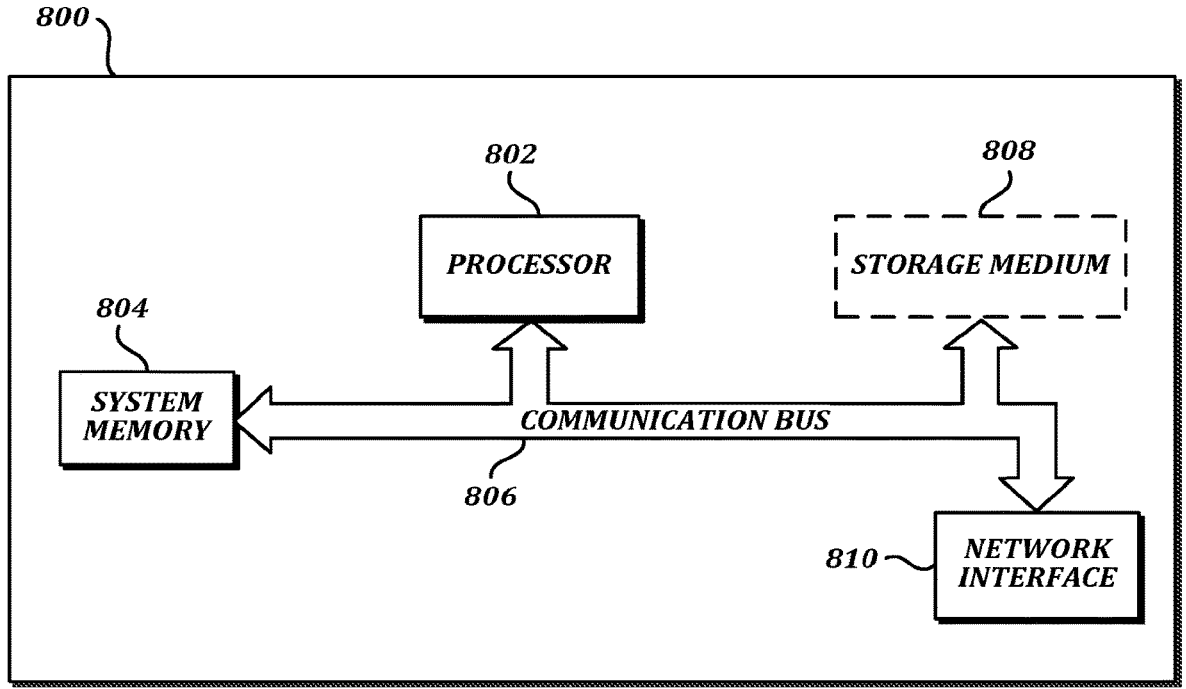
FIG. 8 illustrates aspects of an exemplary computing device appropriate for use with embodiments of the present disclosure.

FIG. 8 illustrates aspects of an exemplary computing device 800 appropriate for use with embodiments of the present disclosure. While FIG. 8 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 800 may be any one of any number of currently available or yet to be developed devices.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, LTE, WiMAX, Bluetooth, and/or the like.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 804 and storage medium 808 depicted in FIG. 8 are merely examples of computer-readable media.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, USB, or other suitable connections protocols using wireless or physical connections. Similarly, the computing device 800 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer readable storage medium associated with a computing device.

Even with the methods and technology described above, retailers wishing to offer a coordinated curbside pickup service nevertheless face the issue of integrating/competing with in-store workflow. Dedicating a full-time employee's attention to facilitate the curbside deliveries full time would likely increase the reliability of perfect timing at the curb, but would be cost prohibitive for smaller retailers, or retailers who have a less-than full time pipeline of curbside orders. Alternatively, a retailer could work to "split" the curbside duty between current employees working in-store, to facilitate the curbside deliveries in a shared piecemeal fashion. But the problem of capturing employee time and attention, especially in a busy environment such as a restaurant, where noise may make timely verbal communication between employees exceedingly difficult while they are juggling multiple other responsibilities, there could be confusion between employees about who should facilitate a given curbside order, perhaps with more than one employee running to take care of the same order, or the alternative example of the order being ignored by everyone, with no one bringing the order to the curb when the driver shows up. Additionally, the retailer must deal with the problem that sometimes certain employees are working with in-store customers and others are not, and then this might switch, with other employees occupied with in-store operations, while others are not—this scenario happening and morphing minute by minute. To get around this problem, some embodiments of the present disclosure provide a wireless dispatch and self-selecting "opt-in" deconfliction/coordination system, to allow store employees to self-select their involvement in facilitating an inbound customer for a given curbside pickup, in a manner that doesn't interfere with their existing workflow.

In some embodiments of the present disclosure, a driver-customer is inbound to a retailer to pick up a curbside-to-go order. As described above, the pickup management system 204 estimates and coordinates the arrival of the customer, and may interface with a retailer system 206 to cause the order to be prepared by the time the customer is expected to arrive. In some embodiments of the present disclosure, upon a determination that the driver-customer is close to arrival, the pickup management system 204 would "ping" the wearable employee devices 207 of all employees at the restaurant, thus alerting the employees wearing the devices 207 to the need of some store employee to facilitate the curbside delivery very soon.

The purpose of this is to seamlessly alert all employees to the impending arrival, giving the opportunity for any of the employees to opt-in to fulfilling that particular order. The system could then allow any of the pinged employees to "claim" responsibility for taking care of that order. This could include actuating a push button on the wearable employee device 207, or could be any other way of using the wearable employee device 207 to acknowledge a "claim" of a specific order, such as a touchscreen interface element, a gesture identified using motion sensors, and/or the like. Once an employee has claimed the order using their wearable employee device 207, they may be provided information on that order (perhaps exclusively to their wearable employee device 207, or using a display system in their viewing field that presents an interface provided by the pickup management system 204, and the exclusion of the other devices that did not claim the order). The employee who claimed the order through their device 207 may then be presented information on that order such as a clock read out or text message, timing instructions, instructions for identifying the customer (such as a name, a license plate number, a car make/model/color, and/or the like), and/or instructions identifying which order from the kitchen or counter they need to take to the customer. The system may include a tipping feature, so that the employee who claims the order through their wearable device 207, and is tipped by the driver through a separate system such as retailer system 206 or payment provider 214, may be ID'd as the delivering employee to facilitate payment of the tip to the correct employee. After facilitating the curbside pick-up, the employee would slip back into their normal workflow, and subsequent curbside pick-up orders would occur in the same fashion, with the employees being simultaneously alerted through their wearable employee devices 207, with the first to claim the order taking responsibility.

In some embodiments, the system described above may ping a group of employees (or an individual employee) about an inbound order, but no one claims the order, perhaps due to all employees being busy with in-store customers, or other distractions. In some embodiments, the system would continue to "ping" the employees, perhaps at random or specific or increasing intervals, or perhaps in an escalating fashion (e.g., to more employees, by using louder or more insistent alerts, and/or the like), as the urgency of being ready to take an order to the pickup location becomes more real. If, at this point, an employee claims the order, then the escalation of alerts to the group of employees would stop. If, however, no one has claimed the order still, the system may escalate in another fashion, perhaps with communication made to an outside person, device, or display, like someone not in the original group to whom the alert was presented, but who acts as person of last resort (such as a manager, seating host, and/or the like). Or the alert may be escalated to a central display system, further capturing attention and urgency of employees. If no employees have "claimed" responsibility for an order, and the inbound customer reaches a threshold too close to the pickup location to allow for a seamless handoff, or if the customer arrives or has already arrived at the pickup location and the system still does not recognize an employee claiming the order, the system may send an automatic message to the waiting or impending customer out near the curb, conveying the delay, or telling them their order will be there in a minute, or providing some other instruction, automatically.

In some embodiments, an employee may claim an order, but then for some unforeseen reason need to opt-out. In such embodiments of the system, an employee who had previously claimed an order may be able to "throw it back to the group", by pushing a button or using some other input technique associated with the wearable device 207. The system would then re-ping the group, per the original course, in order for someone else to claim the responsibility of fulfilling that order. If, for example, it's too close to the arrival of a driver to surrender it back to the group, an employee may be able to direct-designate responsibility for the order, using an interface on the wearable employee device 207 (or a stand-alone interface kiosk)—and directly assigning it to another employee on the networked opt-in system. In some embodiments, the wearable device 207 has a back-up communication means directly to the inbound driver, perhaps to explain the delay or otherwise help coordinate the delivery. In some embodiments, if the driver is too close to arrival for there to be time for an employee to surrender responsibility back to the group of floor staff, the wearable device 207 may tell the employee that it is too late for them to back out and they must fulfill the order.

In some embodiments, there may be two or more concurrent inbound orders, and a first employee would claim responsibility for the first curbside order, and not yet have completed it when the alert to the employees (less one this time—the employee already committed to the first order) is sent out per the description above. In some embodiments of the system, if there are not enough employees to individually accommodate the multiple concurrent orders, the escalation aspect described above may occur to the wearable device 207 associated with the employee already responsible for the first curbside order. In some embodiments of the system, an employee may be able to claim more than one order at a time, if such claimed orders can be fulfilled efficiently by a single employee.

The use of an opt-in system with alerts, enabled by the use of wearable devices 207, has many benefits. For example, it allows employees, who best know their ability to step out of their normal workflow to facilitate a curbside delivery, to self-select, and it also coordinates back-up, so that no order is dropped, and no two employees are working on the same order when they shouldn't be. This opt-in procedure is an example of a procedure that is suitable for use at procedure block 422 illustrated in FIG. 4B.

Some embodiments may include functionality in the wearable device 207 to "meet" the device of the customer at the pickup location, and through a process "sign off" that the order took place, through NFC, scanning of a bar code presented by the device of the customer, and/or the like. Such a technique may also be used to receive or confirm payment using the wearable device 207.

Additional examples are provided in U.S. Provisional Application No. 62/119,707, filed Feb. 23, 2015, and U.S. application Ser. No. 15/051,516, filed Feb. 23, 2016. Applications 62/119,707 and Ser. No. 15/051,516 are hereby incorporated by reference herein in their entirety and for all purposes.

While illustrative embodiments have been illustrated and described, it will be appreciated that various changes can be made therein without departing from the spirit and scope of the present disclosure.

EXAMPLE EMBODIMENTS

Below are some example embodiments of the present disclosure. The embodiments listed below should not be seen as limiting. Instead, any embodiment disclosed anywhere in the accompanying disclosure may be included within the scope of the claims appended hereto. Further, one or ordinary skill in the art will recognize that the embodiments described below may be usable in combination with one another.

A system configured to alert store employees of an estimated time of arrival of an inbound customer to the store location (through a point-of-sale (POS) system, a stand-alone system, a mobile device, or another system), or to a point proximate to store. The alert may or may not be tied to an order.

A system configured to coordinate preparation of orders or items to coincide with an arrival of an ordering customer at a place of business, using estimated time of arrival technologies for the in-bound customer. The system may also be configured to account for any time required for a store employee to travel to a meeting point away from the store.

A system of dormant and armed associations between POS systems and mobile devices, so that said mobile devices may be armed by a retailer, or a retailer POS system, so that the mobile device is "made live" to facilitate inbound communications and locational/estimated time-of-arrival information with the POS system or retailer-side systems.

A system configured to store and present real-time estimated prep times for an order. System may be configured to use machine learning algorithms, learned data, manually entered estimates, user preferences, and/or the like, and may also be configured to monitor real-time order volume, number and composition of orders in queue, user policy on re-queuing, amount of employees to facilitate preparation, and/or any other suitable input.

A system configured to learn and predict preparation times, and to initiate or alert to begin, for real-time collection/preparation of items, to initiate preparation of items intended to be picked up by an inbound party using a GPS technology to predict arrival time such that completion of item and arrival of party coincide.

A system configured to re-queue orders, or to recommend swapping component parts of orders, or to change recommended employee activity. The changes may be based on estimated arrival times of customers requiring service by that employee, who may also be serving other customers. The customer may be given a variety of ways to alter their expected arrival time and/or order composition. The system may be configured to re-queue their order on the merchant order/POS system to best coordinate timing of items for the arrival of a customer that may have a changing estimated time of arrival.

A system configured to push a "location reveal" beacon from a POS system to a mobile computing device, to then tether the mobile computing device to the POS system to provide information on the mobile computing device's geographic location to the POS system, and to compute expected arrival times of a customer intending to visit a location associated with the POS system.

A system configured to provide a personalized coordination technology which employs information about a mobile user's schedule (or future locations/meetings, etc.), to serve as anchor points for better coordinating future logistics about meeting another party.

A system configured to enable multiple parties (such as retailers) to meet a common customer at a common pickup location, and to coordinate preparation and travel of all parties to the common pickup location at a similar time.

A system configured to govern volume, interval, distance of meeting points from a retailer (bird's eye or travel), preparation times, and other retailer preferences for location-tracked and advised inbound customers.

A system configured to link together a chain of "pickup locations" that uses geo-location and predicted arrival times to link to a series of POS systems. If a customer is late or early to one of the pickup locations, the system is configured to swap the order of visitation and to notify the down-stream (remaining) POS systems to be responsive to such activity in the chain of events. The system is configured to provide multi-point dependent chain ETA estimation synced with order preparation activity at each location.

A system configured to cascade, stagger, and/or deconflict a meeting of a plurality of parties at a plurality of designated locations in a geographic area. If one recommended location is "occupied," then next best location is chosen and presented to meeting parties. The next best location may be auto-generated or input by one of the parties, or one of the parties may be told of a delay. The system may communicate with parking-stall availability systems, and/or may use a mapping program to pinpoint meeting locations. The system may be configured to deconflict meetings of parties at the same place by moving a meeting to a different time.

A system configured to generate an interface wherein a user can tap a point on a map, trace a route on a map, enter a destination and coupled with their current location cause a route to be automatically generated, or based off of their current location, and have the interface show all retailers that do curbside pick-up in the area or along a given route. The user may be able to tap on the map and see specific retailer pop-up windows that do curbside pick-up, with an ordering link, and then tap on a location of a map, a pop up icon, or some other identifier of that retailer to be automatically connected through the system described herein.

A system configured to allow a retailer to select and advise on a direction or path of approach that a customer takes to reach the retailer (not just meeting location, but approach-direction).

A system configured to show preparation time estimates (at a retailer) based off of an inputted order or list of items, before, during, or after an order has been placed from a remote mobile device.

A system configured to notify a POS system of a change in an estimated time of arrival of an inbound customer, in order to inform employees of the retailer about possible needed alterations to order preparation.

A system configured to recommend to a retailer employee about moving orders forward or backward in order preparation priority, and also swapping items from orders to more pressing orders requiring fulfillment (the later orders which can then be replenished in enough time), based off of knowing when all customers are expected to arrive at a location to pick up orders. The system is configured to re-queue bulk orders and also to make suggestions on advancing components of orders to more pressing orders, based off of estimated arrival times of inbound customers.

A system configured to store a list of items desired by a customer, or pending orders online, and is configured to alert the customer of similar items nearby, or along their travel route, so that the customer can be prompted to make a purchase, and to have an order prepared for arrival. The system may be configured to compare against prices on the internet to give a purchase/no-purchase decision, and may be able to auto-cancel pending internet orders in case it make more sense to buy now, in person.

A system configured to provide an interface wherein a customer can input a "shopping list" and have an errand route auto-generated (and coordinated with the POS systems of the associated retailers) based off of inventories, preparation times, travel times, and other data inputs.

A system configured to alert an inbound customer of expected wait times for items they plan to pick up, based off of order preparation progress from the retailer side, and also based off of the location and progress (equating to an ETA) of a mobile computing device associated with the customer.

A system configured to notify a customer if an order they have placed through their mobile computing device to a POS system is cancelable (the preparation of the order has not started yet, or it is not perishable and thus ok to cancel order).

A system configured to control mobile orders to a business and have ordering functions controlled by order preparation limits, minimums, or settings, and to make order change recommendations to an ordering customer accordingly.

A mobile computing device configured to offer a touch-link to a system on the other end of a phone conversation based off of the number with which a calling customer is connected.

A system configured to enable a purchase in a single transaction from a mobile computing device items from various retailers, POS systems, or inventories, in order to aggregate purchasing for a string of items to be picked up.

A system configured to alert recommend approach routes in a GPS system, to meet with each other or third parties or geo-fixed locations.

A system configured to communicate with a POS system or a retail merchant system for a retailer employee to pinpoint on an aerial map specific (and perhaps preferentially ordered) meeting locations to be revealed to another party, either visually or verbally. Other inputs may include approach routes, cascading preferences between multiple meeting locations, time windows that move the point around on a map to various meeting locations based on the time of day, times of use and/or non-use, etc.

A mobile ordering system configured to store a catalog of retailers/restaurants for a user which, by tapping the name, can reveal a recommended order of "the usual," along with a trigger to add, change, or delete items from the order to modify what the system remembers as being "the usual."

A system configured to recognize a restaurant or other retailer website, and offers a pop-up window or other input for a customer to order "the usual," with a trigger to a further input for modifications if necessary.

A customer service system configured to automatically flag meetings that are supposed to occur, using one or more GPS-enabled mobile computing devices and/or locations, where one party is late to the meeting or where a specific period of time passes in delay between meeting of parties, time a party is waiting at a meeting location before the other party shows up, parties going to wrong places, or other discrepancies in time and/or place. The meeting can be coordinated by a geo-locational input on one end and a "checkout" or completion confirmation on the other. The system is configured to flag "problem meetings," which are meetings wherein one or more parties using a mobile computing device to meet at a point in time and space where there are inconsistencies over activity, meeting point changes, negotiation back and forth, one party late, and/or if it will lead to downstream connection problems in the case that the party is running a string of meetings.

A device configured to send a push beacon to a mobile phone number, via a mobile number input, tied to a "pick up at store" option of a web purchasing checkout.

A pickup management system connected to a purchase-checkout functionality. There may be an input for a customer to input their phone number, or if the customer is already connected to the system, the purchase page (or a pop-up feature) may know they are connected and will send an arming button through an app to their mobile computing device accordingly.

A computing device configured to provide an interface wherein a mobile user can inform a POS system that they are on their way now, with a button designating an action akin to "on my way now," or, for pick up intended to occur later, and manually inputted sliding window, such as on a sliding time scale, scroll bar, or clock, accompanied by a later trigger button to be initiated when a mobile user intends to travel to the retailer.

What is claimed is:

1. A computing device comprising:
at least one processor;

a wireless interface;
a display;
an input device; and
one or more non-transitory computer-readable medium having computer-executable instructions stored thereon that, in response to execution by the at least one processor, cause the computing device to perform actions comprising:
receiving, via the wireless interface from a pickup management system, a notice about an order to be delivered from a retailer to a customer at a pickup location, wherein the notice includes a predicted arrival time automatically determined by the pickup management system based on real-time location data received from a customer computing device;
presenting a first alert via the display, the first alert being configured to attract attention of an employee;
receiving, via the input device, an input indicating that the employee intends to deliver the order;
in response to receiving the input, automatically transmitting, by the computing device via the wireless interface, an acknowledgement response to the pickup management system, wherein the acknowledgement response causes the pickup management system to automatically cease transmission of the notice to other computing devices;
storing the order, by a queue management engine executing on the at least one processor of the computing device, in a preparation prioritizing queue, wherein the queue management engine is communicatively coupled to an automated food preparation machine, wherein the queue management engine is configured to automatically determine preparation times using machine learning techniques based at least in part on a general time of day noting periods of increased activity, identified bottlenecks in a preparation pipeline, historical performance of employees, and actual preparation times when compared to predicted preparation times;
automatically instructing, by the queue management engine of the computing device, the automated food preparation machine to begin preparation of food items at a time calculated by the computing device to cause the food items to be ready at the predicted arrival time;
receiving, via the wireless interface, an escalation notice for the order, wherein the escalation notice is automatically generated by the pickup management system in response to determining that the customer has arrived at the pickup location before handoff of the order;
in response to receiving the escalation notice, automatically presenting multiple subsequent alerts on the display, wherein the multiple subsequent alerts are presented at increasing intervals; and
in response to determining that no employee has claimed the order and the customer has arrived at the pickup location, automatically transmitting, by the computing device via the wireless interface, a message to the customer computing device associated with the customer, the message conveying a delay in handoff of the order.

2. The computing device of claim 1, wherein the actions further comprise:
presenting, via the display, information regarding at least one of the order, the customer, or the pickup location.

3. The computing device of claim 1, further comprising a vibration motor, and wherein presenting the first alert includes activating the vibration motor.

4. The computing device of claim 1, wherein the actions further comprise:

receiving, via the input device, an input indicating that the employee can no longer deliver the order; and transmitting, via the wireless interface, an opt-out response indicating that the employee will not be able to deliver the order.

5. The computing device of claim 1, wherein the actions further comprise interacting with a customer device of the customer to verify completion of handoff.

6. The computing device of claim 5, further comprising an optical scanner, and wherein interacting with the customer device to verify the completion of the handoff includes scanning a code displayed by the customer device.

7. The computing device of claim 5, further comprising a near-field communication (NFC) device, and wherein interacting with the customer device to verify the completion of the handoff includes obtaining information from the customer device via the NFC device.

8. The computing device of claim 1, wherein the input device includes at least one of a push button, an accelerometer, or a touchscreen.

9. The computing device of claim 1, wherein the actions further comprise, in response to receiving the escalation notice, automatically sending a message to the customer computing device including at least one of an indication of a wait time or providing an instruction.

10. The computing device of claim 1, wherein the actions further comprise:

dynamically reordering the preparation prioritizing queue based on a recalculated predicted arrival time received from the pickup management system, wherein the recalculated predicted arrival time is based on updated real-time location data from the customer computing device.

11. A method comprising:

transmitting, by a pickup management system of a computing device, a first notification indicating an order for handoff to a customer at a pickup location, wherein the first notification includes a predicted arrival time automatically determined based on real-time location data received from a customer computing device;

receiving, by the pickup management system from a device associated with an employee, an acknowledgement response to the first notification, wherein the acknowledgement response causes the pickup management system to automatically cease transmission of the first notification to other computing devices;

storing the order in a preparation prioritizing queue, wherein the preparation prioritizing queue is used by a preparation queue management engine for instructing an automated food preparation machine to begin preparation of food items at a time based on handoff of the order, wherein the preparation queue management engine is configured to automatically determine preparation times using machine learning techniques based at least in part on a general time of day noting periods of increased activity, identified bottlenecks in a preparation pipeline, historical performance of employees, and actual preparation times when compared to predicted preparation times;

automatically instructing the automated food preparation machine to begin preparation of food items at a time calculated to cause the food items to be ready at the predicted arrival time;

transmitting, by the pickup management system, information relating to the order to the computing device for presentation by the computing device;

receiving an escalation notice for the order, wherein the escalation notice is automatically generated in response to determining that the customer has arrived at the pickup location before handoff of the order;

transmitting, based at least in part on receiving the escalation notice, multiple subsequent alerts to the computing device associated with the employee, wherein the multiple subsequent alerts are presented at increasing intervals; and in response to determining that no employee has claimed the order and the customer has arrived at the pickup location, automatically transmitting, by the pickup management system, a message to the customer computing device associated with the customer, the message conveying a delay in handoff of the order.

12. The method of claim 11, further comprising receiving, by the pickup management system from the device, a confirmation that the order was delivered to the customer at the pickup location.

13. The method of claim 11, further comprising:

receiving, by the pickup management system, an opt-out notification indicating that the employee associated with the device can no longer deliver the order;

transmitting, by the pickup management system, a third notification indicating the order for handoff to the customer at the pickup location; and receiving, by the pickup management system from a second device, a second acknowledgement response to the third notification.

14. The method of claim 11, further comprising:

in response to determining that greater than a threshold amount of time has passed before receiving the acknowledgement response, transmitting, by the pickup management system, an escalated notification indicating the order for handoff to the customer at the pickup location.

15. The method of claim 14, wherein the escalated notification is transmitted to more devices than the first notification.

16. The method of claim 11, wherein the information related to the order includes one or more of identifying information for the customer, identifying information for a vehicle of the customer, identifying information for the order, or directions to the pickup location.

17. A system comprising:

at least one processor; and one or more non-transitory computer-readable medium having computer-executable instructions stored thereon that, in response to execution by the at least one processor, cause the system to perform actions comprising:

transmitting a first notification to a first plurality of computing devices, the first notification indicating an order for handoff to a customer at a pickup location, wherein the first notification includes a predicted arrival time automatically determined based on real-time location data received from a customer computing device;

receiving, from an accepting computing device of the first plurality of computing devices, an acknowledgement response to assign the order for handoff to the accepting computing device, wherein the acknowledgement response causes the system to automatically cease transmission of the first notification to other computing devices of the first plurality of computing devices;

storing the order in a preparation prioritizing queue, wherein the preparation prioritizing queue is used by a preparation queue management engine for instructing an automated food preparation machine to begin preparation of food items at a time based on handoff of the order, wherein the preparation queue management engine is configured to automatically determine preparation times using machine learning techniques based at least in part on a general time of day noting periods of increased activity, identified bottlenecks in a preparation pipeline, historical performance of employees, and actual preparation times when compared to predicted preparation times;

automatically instructing the automated food preparation machine to begin preparation of food items at a time calculated to cause the food items to be ready at the predicted arrival time;

transmitting order information to the accepting computing device;

receiving an escalation notice for the order, wherein the escalation notice is automatically generated in response to determining that the customer has arrived at the pickup location before handoff of the order;

transmitting, based at least in part on receiving the escalation notice, multiple subsequent alerts to the accepting computing device, wherein the multiple subsequent alerts are presented at increasing intervals; and in response to determining that no employee has claimed the order and the customer has arrived at the pickup location, automatically transmitting a message to the customer computing device associated with the customer, the message conveying a delay in handoff of the order.

18. The system of claim 17, the actions further comprising:

transmitting a third notification to a second plurality of employee devices upon determining that the acknowledgement response has not been received within a predetermined amount of time after transmitting the first notification.

19. The system of claim 18, the actions further comprising:

presenting a first alert upon receiving the first notification; and presenting a second alert different from the first alert upon receiving the escalation notice.

20. The system of claim 17, the actions further comprising:

receiving a handoff confirmation from the accepting computing device upon completion of the handoff of the order to the customer at the pickup location.

* * * * *